US012607951B2

(12) United States Patent
Sato

(10) Patent No.: US 12,607,951 B2
(45) Date of Patent: Apr. 21, 2026

(54) DRUM CARTRIDGE HAVING MOVABLE FIRST HOUSING, IMMOVABLE SECOND HOUSING, AND GASKET SEALING THEREBETWEEN, AND IMAGE-FORMING APPARATUS USING THE SAME

(71) Applicant: BROTHER KOGYO KABUSHIKI KAISHA, Nagoya (JP)

(72) Inventor: Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/734,275

(22) Filed: Jun. 5, 2024

(65) Prior Publication Data

US 2025/0053117 A1 Feb. 13, 2025

(30) Foreign Application Priority Data

Aug. 7, 2023 (JP) ................................ 2023-128651

(51) Int. Cl.
*G03G 15/08* (2006.01)
*G03G 15/00* (2006.01)
*G03G 21/16* (2006.01)

(52) U.S. Cl.
CPC ..... *G03G 15/0886* (2013.01); *G03G 15/0806* (2013.01); *G03G 15/6558* (2013.01); *G03G 21/1619* (2013.01)

(58) Field of Classification Search
CPC ........... G03G 15/0886; G03G 15/0806; G03G 15/6558; G03G 21/1619
See application file for complete search history.

(56) References Cited

U.S. PATENT DOCUMENTS

2010/0272474 A1* 10/2010 Sato .................. G03G 15/0886 399/258
2017/0108800 A1* 4/2017 Sato .................. G03G 15/0886
2021/0063958 A1 3/2021 Taguchi et al.
2021/0191311 A1 6/2021 Sato et al.
2021/0405554 A1* 12/2021 Sato .................. G03G 15/0886
2022/0011691 A1 1/2022 Sato
2023/0062417 A1 3/2023 Kato et al.

FOREIGN PATENT DOCUMENTS

JP 2018-25571 A 2/2018
JP 2021-039214 A 3/2021
JP 2021-101210 A 7/2021
JP 2022-015016 A 1/2022
JP 2023-064435 A 5/2023

* cited by examiner

*Primary Examiner* — Sandra Brase
(74) *Attorney, Agent, or Firm* — Merchant & Gould P.C.

(57) ABSTRACT

A drum cartridge includes a photosensitive drum rotatable about an axis extending in a first direction, a developing roller configured to supply toner to the photosensitive drum, and a developing housing configured to store the toner therein. The developing housing includes a first housing supporting the developing roller, a second housing having an inlet port, and a gasket providing a sealing between the first housing and the second housing. The first housing is movable relative to the photosensitive drum. The second housing is immovable relative to the photosensitive drum. The gasket is elastically deformable in response to movement of the first housing relative to the photosensitive drum.

11 Claims, 24 Drawing Sheets

DRUM CARTRIDGE HAVING MOVABLE FIRST HOUSING, IMMOVABLE SECOND HOUSING, AND GASKET SEALING THEREBETWEEN, AND IMAGE-FORMING APPARATUS USING THE SAME

REFERENCE TO RELATED APPLICATIONS

This application claims priority from Japanese Patent Application No. 2023-128651 filed on Aug. 7, 2023. The entire content of the priority application is incorporated herein by reference.

BACKGROUND ART

Conventionally, as a drum cartridge of an image-forming apparatus, there has been known a drum cartridge to which a toner cartridge is detachably attachable.

This conventional drum cartridge includes a photosensitive drum, a developing housing, and a developing roller. The developing housing supports the developing roller. The developing housing is movable relative to the photosensitive drum so that the developing roller can be pressed against the photosensitive drum with a constant pressing force. An entirety of the developing housing is movable together with the toner cartridge in a state where the toner cartridge is attached to the drum cartridge.

SUMMARY

According to the above-described conventional drum cartridge, the developing housing as a whole is movable together with the toner cartridge. Therefore, as a capacity of the toner cartridge increases, the developing housing becomes harder to move relative to the photosensitive drum due to an increase in weight of the toner cartridge. For this reason, in this conventional drum cartridge, enlarging the capacity of the toner cartridge may not be practical.

In view of the foregoing, it is an object of the present disclosure to provide a drum cartridge and an image-forming apparatus capable of enlarging a capacity of a toner cartridge for use therewith.

In order to attain the above and other objects, according to one aspect, the present disclosure provides a drum cartridge including a photosensitive drum, a developing roller, and a developing housing. The photosensitive drum is rotatable about an axis extending in a first direction. The developing roller is configured to supply toner to the photosensitive drum. The developing housing is configured to accommodate the toner therein. The developing housing includes a first housing, a second housing, and a gasket. The first housing supports the developing roller. The first housing is movable relative to the photosensitive drum. The second housing has an inlet port through which the toner can flow into the second housing. The second housing is immovable relative to the photosensitive drum. The gasket provides a sealing between the first housing and the second housing. The gasket is elastically deformable in response to movement of the first housing relative to the photosensitive drum.

With this structure, a portion of the developing housing supporting the developing roller (i.e., the first housing) is movable relative to the photosensitive drum, whereas another portion of the developing housing having the inlet port (i.e., the second housing) is immovable relative to the photosensitive drum.

Accordingly, the developing roller can be made movable relative to the photosensitive drum without displacement of the toner cartridge in the state where the toner cartridge is coupled to the drum cartridge. That is, the pressing force of the developing roller against the photosensitive drum can be maintained constant irrespective of the weight of the toner cartridge. As a result, the capacity of the toner cartridge can be enlarged.

Further, the gasket provides a sealing between the first housing and the second housing, and the gasket is also elastically deformable in response to the displacement of the first housing relative to the photosensitive drum. Hence, this structure can suppress leakage of toner through the boundary between the first housing and the second housing.

According to another aspect, the present disclosure also provides an image-forming apparatus including a housing, the drum cartridge according to the one aspect, and a toner cartridge. The drum cartridge is attachable to and detachable from the housing. The toner cartridge is configured to accommodate toner therein. The toner cartridge is attachable to and detachable from the housing. The toner cartridge is coupled to the drum cartridge in a state where both the toner cartridge and the drum cartridge are attached to the housing.

With this structure, since the image-forming apparatus includes the above-described drum cartridge, the capacity of the toner cartridge can be enlarged.

DESCRIPTION

1. Outline of Image-Forming Apparatus 1

Figure 1:
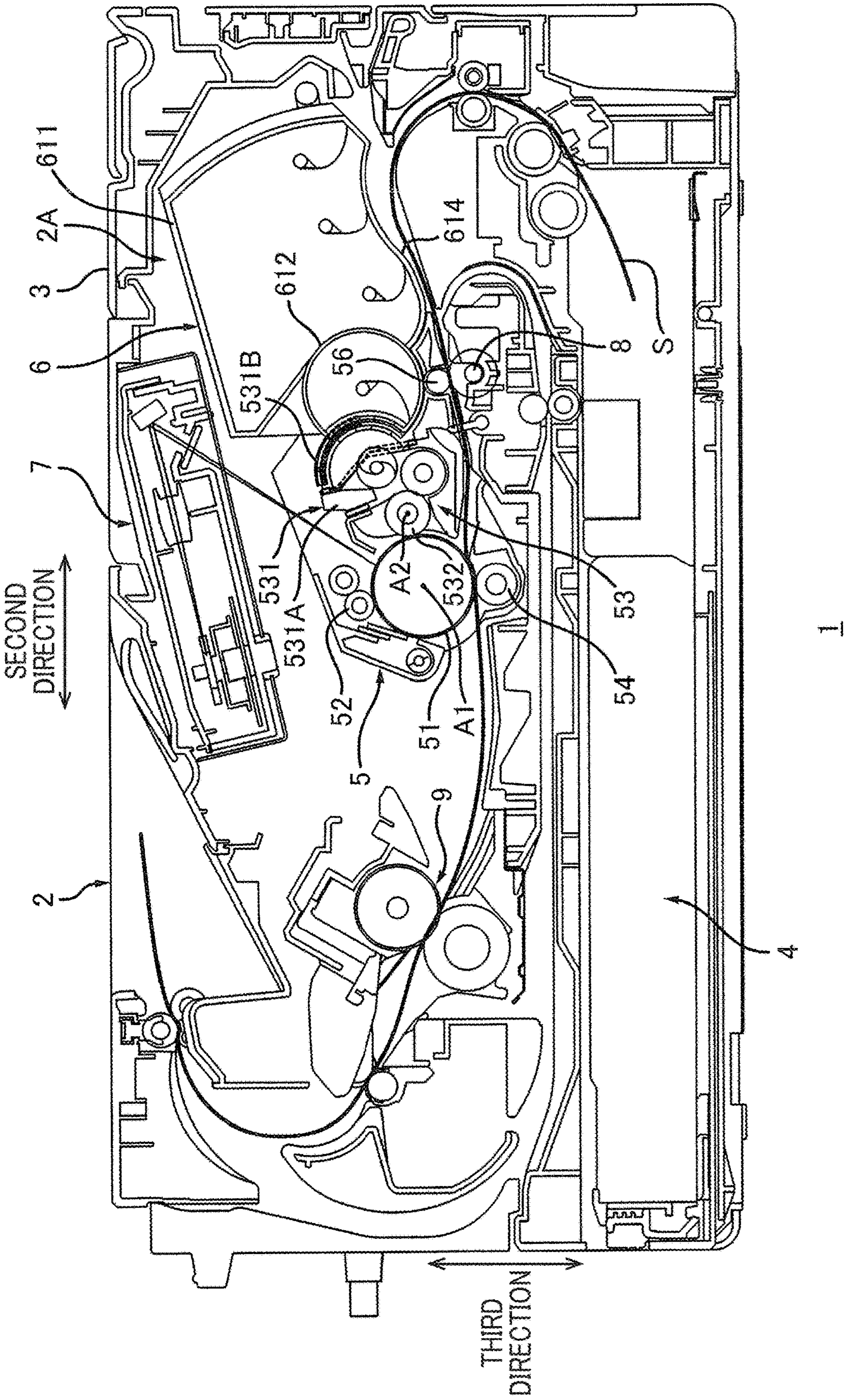
FIG. 1 is a schematic cross-sectional view of an image-forming apparatus according to one embodiment of the disclosure.

An image-forming apparatus 1 according to one embodiment of the present disclosure will be described with reference to FIGS. 1 and 2.

The image-forming apparatus 1 includes a housing 2, a cover 3, a sheet accommodating unit 4, a drum cartridge 5, a toner cartridge 6, an exposing device 7, a conveyer roller 8, and a fixing device 9.

1.1 Housing 2 and Cover 3

The housing 2 accommodates therein the sheet accommodating unit 4, the drum cartridge 5, the toner cartridge 6, the exposing device 7, the conveyer roller 8, and the fixing device 9. As illustrated in FIG. 2, the housing 2 has an opening 2A.

Figure 2:
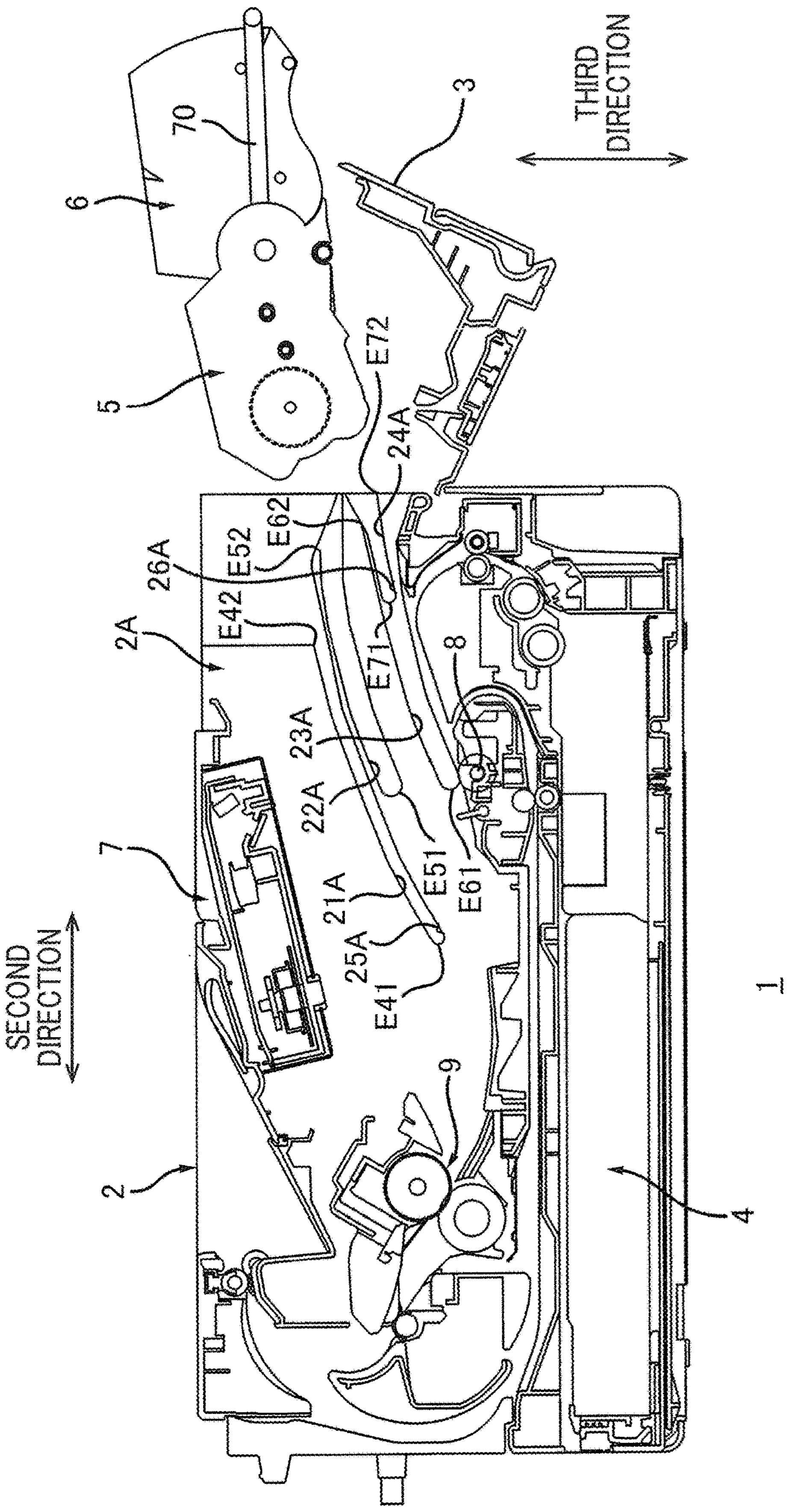
FIG. 2 is another schematic cross-sectional view of the image forming apparatus in a state where both a drum cartridge and a toner cartridge are detached from a housing with the toner cartridge attached to the drum cartridge.

The cover 3 is movable between a closed position (depicted in FIG. 1) and an open position (depicted in FIG. 2). The cover 3 closes the opening 2A when the cover 3 is at the closed position, and the cover 3 opens the opening 2A when the cover 3 is at the open position.

1.2 Sheet Accommodating Unit 4

As illustrated in FIG. 1, the sheet accommodating unit 4 is configured to accommodate a sheet S thereon. The sheet S on the sheet accommodating unit 4 is configured to be conveyed toward the conveyer roller 8.

1.3 Drum Cartridge 5

The drum cartridge 5 is attachable to and detachable from the housing 2.

Specifically, the drum cartridge 5 is configured to be attached to the housing 2 through the opening 2A while the cover 3 is at the open position. The drum cartridge 5 includes a photosensitive drum 51, a charging roller 52, a developing unit 53, and a transfer roller 54.

1.3.1 Photosensitive Drum 51

The photosensitive drum 51 is rotatable about an axis A1. The axis A1 extends in a first direction in a state where the drum cartridge 5 is attached to the housing 2. The photosensitive drum 51 extends in the first direction. The photosensitive drum 51 has a hollow cylindrical shape.

1.3.2 Charging Roller 52

The charging roller 52 is configured to charge the photosensitive drum 51. Instead of the charging roller 52, a scorotron charger may be provided in the image-forming apparatus 1.

1.3.3 Developing Unit 53

The developing unit 53 is configured to supply toner to the photosensitive drum 51. The developing unit 53 includes a developing housing 531, and a developing roller 532.

The developing housing 531 is configured to store toner therein. The developing roller 532 is supported by one end portion of the developing housing 531 in a second direction. The second direction crosses the first direction. Preferably, the second direction be orthogonal to the first direction. The second direction is horizontal in a state where the drum cartridge 5 is attached to the housing 2 when the image-forming apparatus 1 is placed on a horizontal plane.

The developing roller 532 is configured to supply the toner stored in the developing housing 531 to the photosensitive drum 51. The developing roller 532 is in contact with the photosensitive drum 51. Incidentally, the developing roller 532 may be able to be separated from the photosensitive drum 51. The developing roller 532 is rotatable about a developing axis A2. The developing axis A2 extends in the first direction. The developing roller 532 extends in the first direction. The developing roller 532 has a solid cylindrical shape.

1.3.4 Transfer Roller 54

The transfer roller 54 is in contact with a peripheral surface of the photosensitive drum 51. The transfer roller 54 is configured to transfer the toner on the peripheral surface of the photosensitive drum 51 to the sheet S.

1.4 Toner Cartridge 6

The toner cartridge 6 is configured to store toner therein. The toner cartridge 6 is attachable to and detachable from the housing 2. Specifically, the toner cartridge 6 is configured to be attached to the housing 2 through the opening 2A while the cover 3 is at the open position.

The toner cartridge 6 is coupled to the drum cartridge 5 in the state where both the drum cartridge 5 and the toner cartridge 6 are attached to the housing 2. The toner cartridge 6 is configured to supply the toner stored therein to the developing housing 531 in a state where the toner cartridge 6 is coupled to the drum cartridge 5.

1.5 Exposing Device 7

The exposing device 7 is configured to expose the peripheral surface of the photosensitive drum 51 to light after the peripheral surface is charged by the charging roller 52 in the state where the drum cartridge 5 is attached to the housing 2. The developing unit 53 is configured to supply the toner to the exposed peripheral surface of the photosensitive drum 51. In the present embodiment, the exposing device 7 is a laser scanning unit. Alternatively, an LED head may be used as the exposing device 7.

1.6 Conveyer Roller 8

The conveyer roller 8 is configured to convey the sheet S fed from the sheet accommodating unit 4 toward the photosensitive drum 51.

1.7 Fixing Device 9

The fixing device 9 is positioned apart from the cover 3 in the second direction. The fixing device 9 is configured to fix the toner to the sheet S. The fixing device 9 is configured to apply heat and pressure to the sheet S on which the toner has been transferred for fixing the toner to the sheet S. The sheet S having moved past the fixing device 9 is finally discharged onto an upper surface of the housing 2.

2. Details of Drum Cartridge 5

The drum cartridge 5 will be described in detail with reference to FIGS. 3 through 11.

Figure 3:
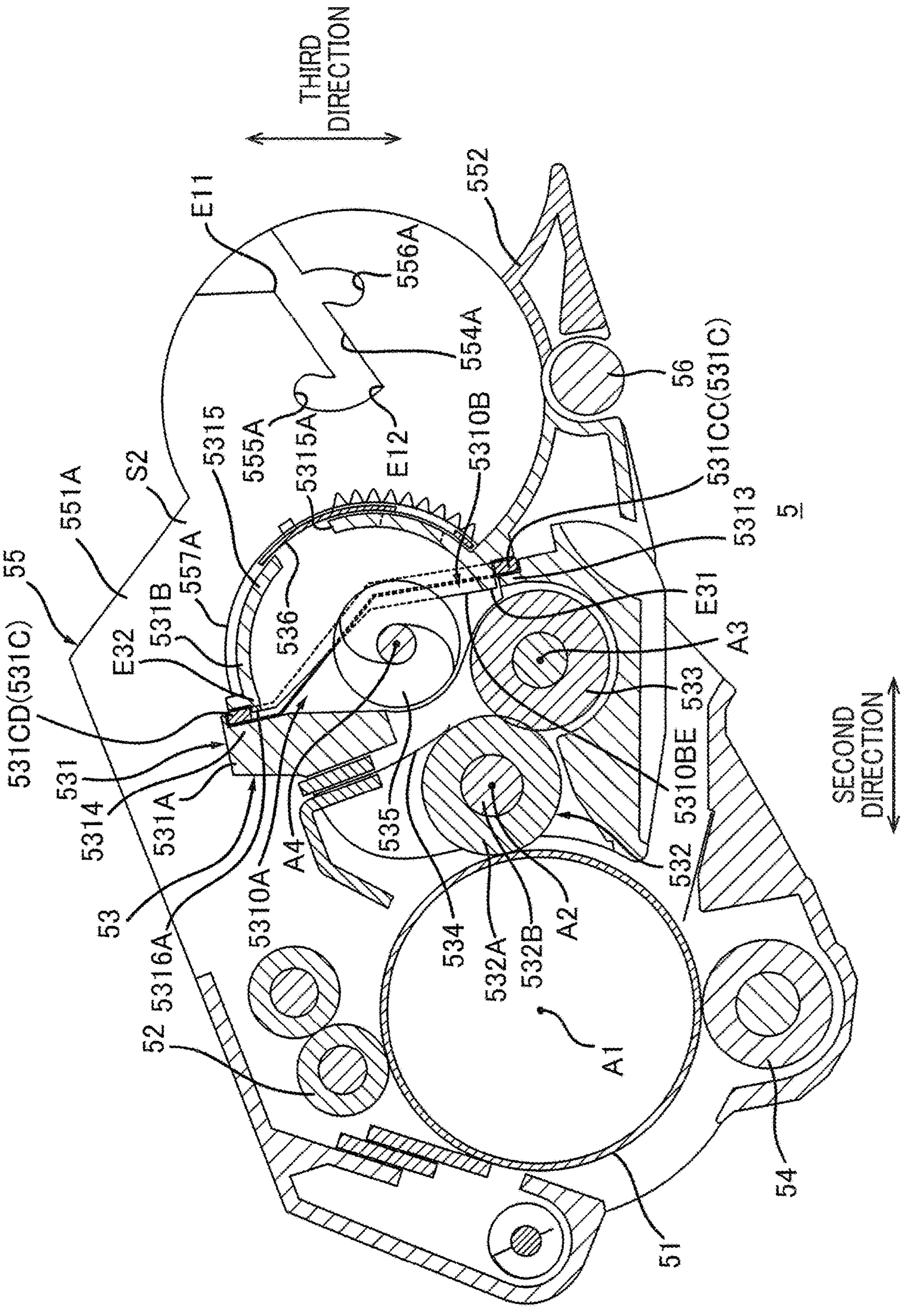
FIG. 3 is a cross-sectional view of the drum cartridge taken along a line III-III in FIG. 4.
Figure 4:
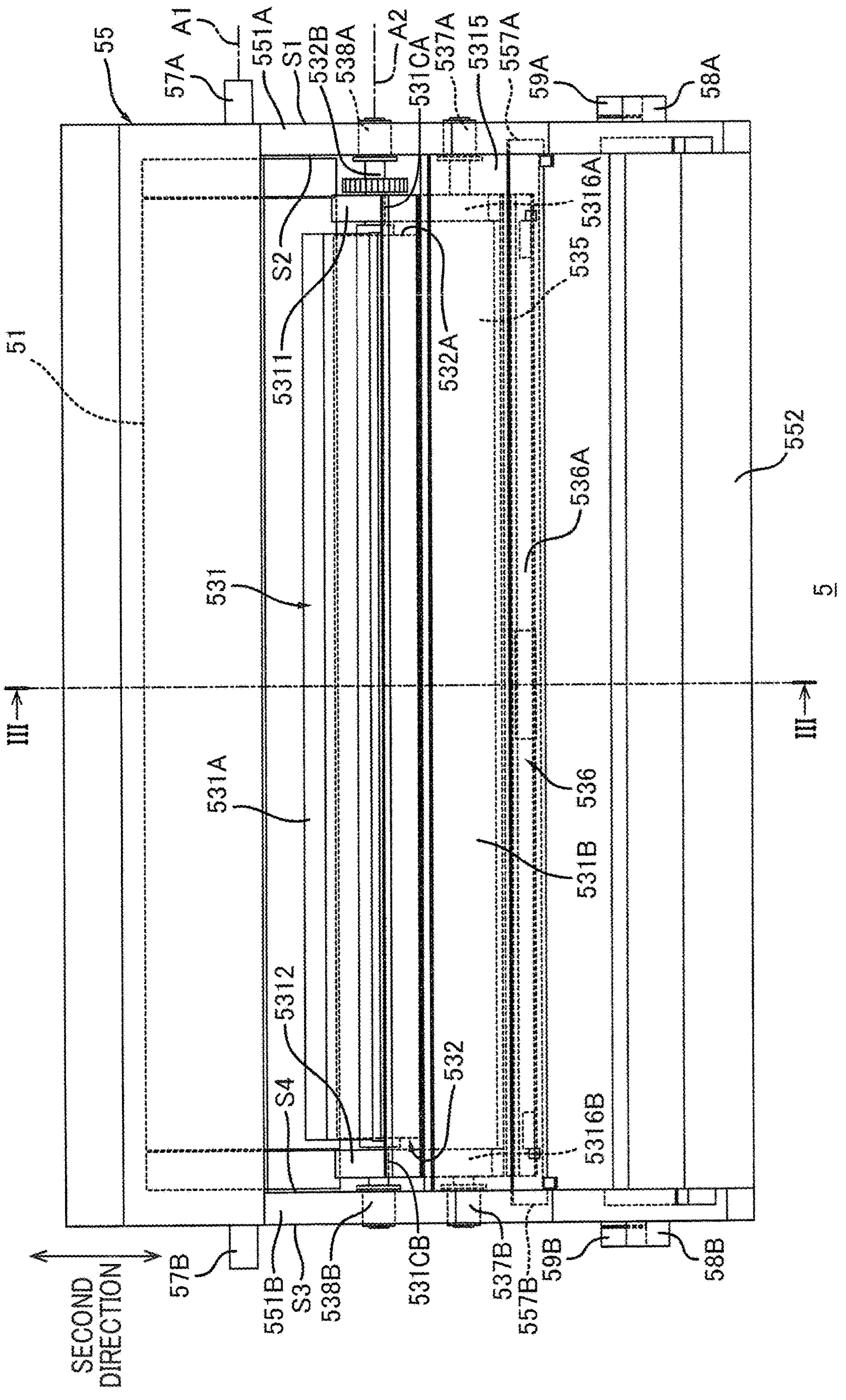
FIG. 4 is a plan view of the drum cartridge of FIG. 3.

As illustrated in FIGS. 3 and 4, the drum cartridge 5 further includes a drum frame 55, a counter roller 56, and a plurality of protrusions 57A, 57B, 58A, 58B, 59A and 59B, in addition to the above-described photosensitive drum 51, charging roller 52, developing unit 53, and transfer roller 54.

2.1 Drum Frame 55

The drum frame 55 supports the photosensitive drum 51, the charging roller 52, the developing unit 53, the transfer roller 54, and the counter roller 56. As illustrated in FIG. 4, the drum frame 55 includes a first frame 551A, a second frame 551B, and a supporting portion 552. In other words, the drum cartridge 5 includes the first frame 551A, the second frame 551B, and the supporting portion 552.

2.1.1 First Frame 551A

Figure 5:
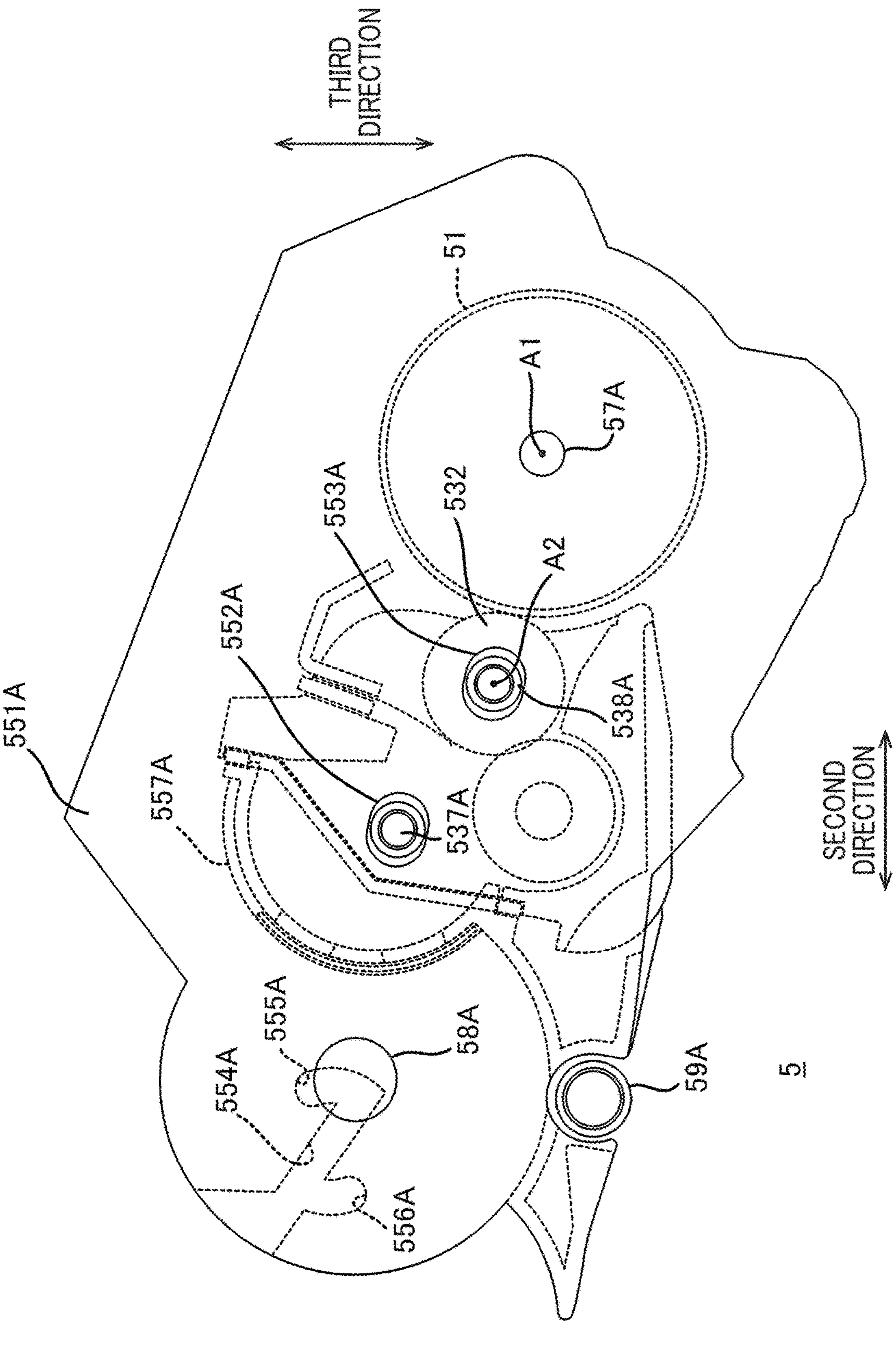
FIG. 5 is a side view of the drum cartridge as viewed from one side in a first direction.

The first frame 551A constitutes one end portion of the drum frame 55 in the first direction. The first frame 551A supports one end portion of the photosensitive drum 51 in the first direction. The first frame 551A extends in a direction crossing the first direction. Preferably, the first frame 551A extend in a direction perpendicular to the first direction. The first frame 551A has an outer surface S1 and an inner surface S2. As illustrated in FIG. 5, the first frame 551A has two through-holes 552A and 553A, a guide part 554A, a locking part 555A, a locking part 556A, and a shutter guide 557A.

The through-hole 552A is positioned apart from the photosensitive drum 51 in a direction defined by connecting the axis A1 to the developing axis A2 (hereinafter, will be referred to as 'connecting direction from the axis A1 to the developing axis A2'). The through-hole 552A is positioned between the protrusions 57A and 58A in the connecting direction from the axis A1 to the developing axis A2. The through-hole 552A is elongated in the connecting direction from the axis A1 to the developing axis A2.

The through-hole 553A is positioned between the photosensitive drum 51 and the through-hole 552A in the connecting direction from the axis A1 to the developing axis A2. The through-hole 553A is positioned between the protrusion 57A and the through-hole 552A in the connecting direction from the axis A1 to the developing axis A2. The through-hole 553A is elongated in the connecting direction from the axis A1 to the developing axis A2.

As illustrated in FIG. 3, the guide part 554A is positioned on the inner surface S2 of the first frame 551A. In the present embodiment, the guide part 554A is in a form of a groove. The guide part 554A extends in a direction crossing both the first direction and the second direction. The guide part 554A has a first end portion E11 and a second end portion E12 in an extending direction thereof. The first end portion E11 is positioned farther from the photosensitive drum 51 than the second end portion E12 is from the photosensitive drum 51 in the second direction. The second end portion E12 is positioned between the photosensitive drum 51 and the first end portion E11 in the second direction.

The locking part 555A is positioned on the inner surface S2 of the first frame 551A. The locking part 555A is positioned at the second end portion E12 of the guide part 554A. In the present embodiment, the locking part 555A is in a form of a groove. The locking part 555A extends from the second end portion E12 in a direction crossing the extending direction of the guide part 554A. The locking part 555A has an arcuate shape.

The locking part 556A is positioned on the inner surface S2 of the first frame 551A. The locking part 556A is positioned at the first end portion E11 of the guide part 554A. In the present embodiment, the locking part 556A is in a form of a groove. The locking part 556A extends from the first end portion E11 in a direction crossing the extending direction of the guide part 554A. The locking part 556A extends in a direction opposite the extending direction of the locking part 555A with respect to the guide part 554A. The locking part 556A has an arcuate shape.

The shutter guide 557A is positioned on the inner surface S2 of the first frame 551A. The shutter guide 557A is positioned opposite the photosensitive drum 51 with respect to the developing housing 531. The shutter guide 557A has an arcuate shape. In the present embodiment, the shutter guide 557A is in a form of a groove. The shutter guide 557A extends in a direction in which a developing shutter 536 (described later) of the developing unit 53 is movable. The shutter guide 557 is configured to guide one end portion of the developing shutter 536 in the first direction. The developing shutter 536 will be described later in detail.

2.1.2 Second Frame 551B

Figure 6:
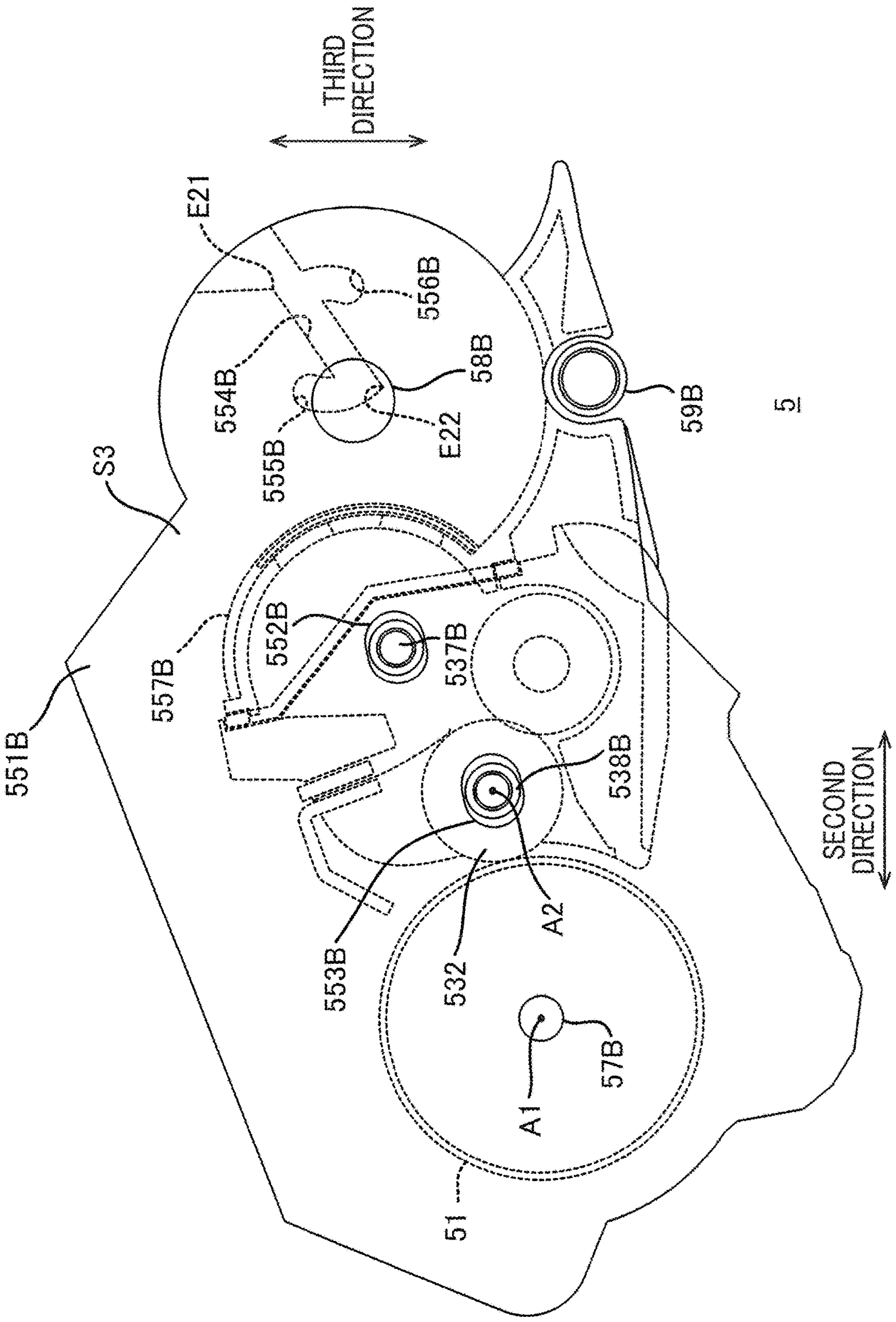
FIG. 6 is a side view of the drum cartridge as viewed from another side in the first direction.

As illustrated in FIG. 4, the second frame 551B constitutes another end portion of the drum frame 55 in the first direction. The second frame 551B is positioned apart from the first frame 551A in the first direction. The second frame 551B supports another end portion of the photosensitive drum 51 in the first direction. In this way, the drum frame 55 supports the photosensitive drum 51 with the first frame 551A supporting the one end portion in the first direction of the photosensitive drum 51, and with the second frame 551B supporting the other end portion in the first direction of the photosensitive drum 51. The second frame 551B extends in a direction crossing the first direction. Preferably, the second frame 551B extend in the direction perpendicular to the first direction. The second frame 551B has an outer surface S3 and an inner surface S4. As illustrated in FIG. 6, the second frame 551B has two through-holes 552B and 553B, a guide part 554B, a locking part 555B, a locking part 556B, and a shutter guide 557B.

The through-hole 552B is positioned apart from the photosensitive drum 51 in the connecting direction from the axis A1 to the developing axis A2. The through-hole 552B is positioned between the protrusions 57B and 58B in the connecting direction from the axis A1 to the developing axis A2. The through-hole 552B is elongated in the connecting direction from the axis A1 to the developing axis A2.

The through-hole 553B is positioned between the photosensitive drum 51 and the through-hole 552B in the connecting direction from the axis A1 to the developing axis A2. The through-hole 553B is positioned between the protrusion 57B and the through-hole 552B in the connecting direction from the axis A1 to the developing axis A2. The through-hole 553B is elongated in the connecting direction from the axis A1 to the developing axis A2.

The guide part 554B is positioned on the inner surface S4 of the second frame 551B. In the present embodiment, the guide part 554B is in a form of a groove. In the present embodiment, the guide part 554B extends in the same direction as the guide part 554A extends (see FIG. 3). The guide part 554B has a first end portion E21 and a second end portion E22 in an extending direction thereof. The first end portion E21 is positioned farther from the photosensitive drum 51 than the second end portion E22 is from the photosensitive drum 51 in the second direction. The second end portion E22 is positioned between the photosensitive drum 51 and the first end portion E21 in the second direction.

The locking part 555B is positioned on the inner surface S4 of the second frame 551B. The locking part 555B is positioned at the second end portion E22 of the guide part 554B. In the present embodiment, the locking part 555B is in a form of a groove. In the present embodiment, the locking part 555B extends in the same direction as the locking part 555A extends (see FIG. 3). The locking part 555B has an arcuate shape.

The locking part 556B is positioned on the inner surface S4 of the second frame 551B. The locking part 556B is positioned at the first end portion E21 of the guide part 554B. In the present embodiment, the locking part 556B is in a form of a groove. In the present embodiment, the locking part 556B extends in the same direction as the locking part 556A extends (see FIG. 3). The locking part 556B has an arcuate shape.

The shutter guide 557B is positioned on the inner surface S4 of the second frame 551B. The shutter guide 557B is positioned opposite the photosensitive drum 51 with respect to the developing housing 531. The shutter guide 557B has an arcuate shape. In the present embodiment, the shutter guide 557B is in a form of a groove. The shutter guide 557B extends in a direction in which the developing shutter 536 (described later) of the developing unit 53 is movable. The shutter guide 557 is configured to guide another end portion of the developing shutter 536 in the first direction.

2.1.3 Supporting Portion 552

As illustrated in FIG. 4, the supporting portion 552 extends in the first direction and the second direction. The supporting portion 552 is positioned between the first frame 551A and the second frame 551B in the first direction. The supporting portion 552 has one end in the first direction that is connected to the first frame 551A. The supporting portion 552 has another end in the first direction that is connected to the second frame 551B. The supporting portion 552 supports a second storage portion 612 (see FIG. 12, described later) of the toner cartridge 6.

2.2 Details of Developing Unit 53

As illustrated in FIG. 3, the developing unit 53 includes a supply roller 533, a layer thickness regulation blade 534, a conveying member 535, the developing shutter 536, two protrusions 537A and 538A (see FIG. 4), and two protrusions 537B and 538B (see FIG. 4), in addition to the above-described developing housing 531 and the developing roller 532. In other words, the drum cartridge 5 includes the supply roller 533, the layer thickness regulation blade 534, the conveying member 535, the developing shutter 536, the two protrusions 537A and 538A, and the two protrusions 537B and 538B, in addition to the developing housing 531 and the developing roller 532.

2.2.1 Details of Developing Housing 531

As illustrated in FIG. 4, the developing housing 531 is positioned between the first frame 551A and the second frame 551B in the first direction. The developing housing 531 extends in the first direction.

As illustrated in FIG. 3, the developing housing 531 includes a first housing 531A, a second housing 531B, and a gasket 531C.

2.2.1.1 Details of First Housing 531A

The first housing 531A is positioned between the photosensitive drum 51 and the second housing 531B in the second direction. The first housing 531A supports the developing roller 532.

Figure 7:
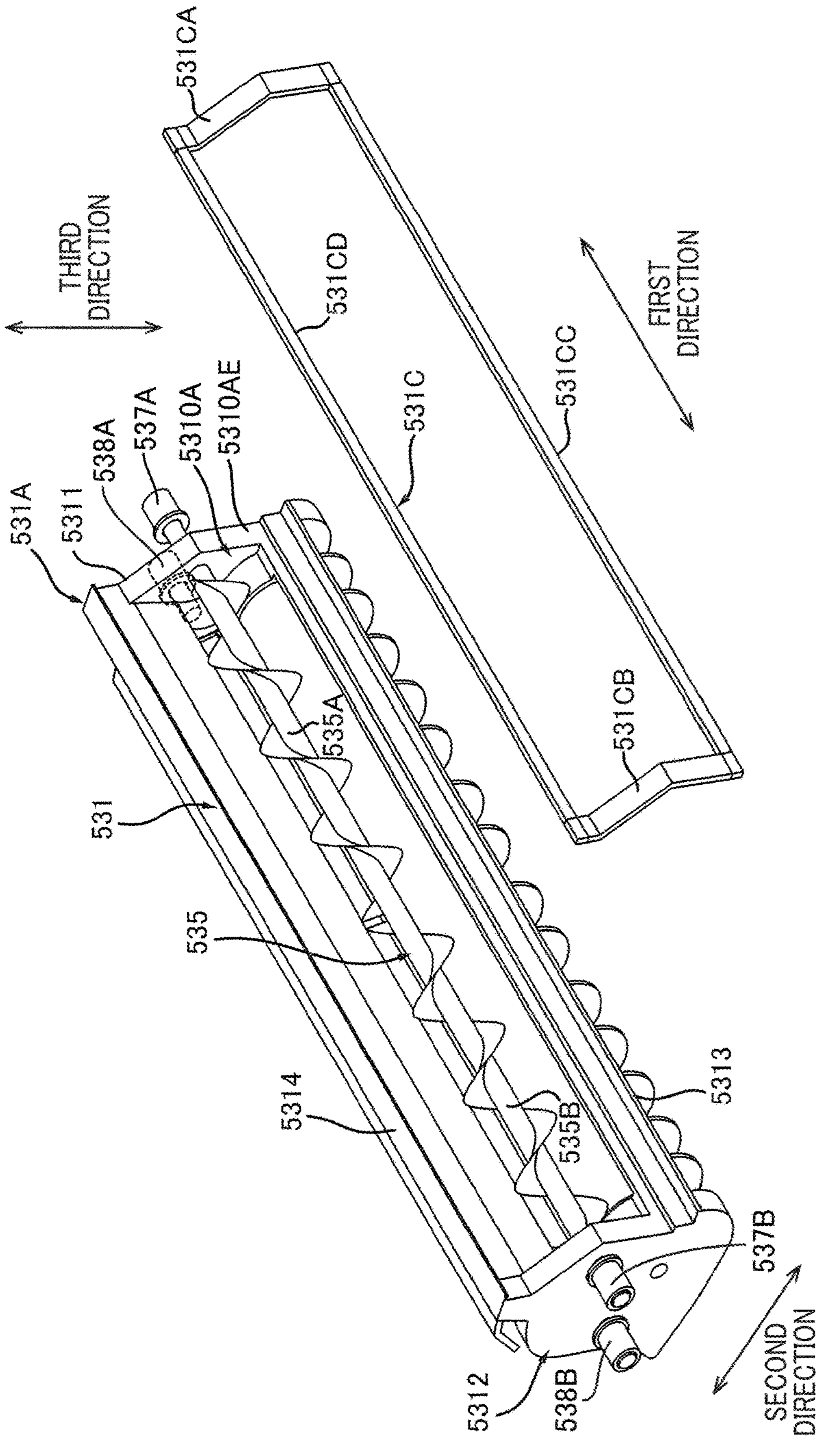
FIG. 7 is a perspective view of a part of a developing unit and a gasket of the drum cartridge.

As illustrated in FIG. 4, the first housing 531A is positioned between the first frame 551A and the second frame 551B in the first direction. The first housing 531A extends in the first direction. As illustrated in FIG. 7, the first housing 531A includes a first wall 5311, a second wall 5312, a third wall 5313, and a fourth wall 5314. The first housing 531A has an opening 5310A (see FIG. 3).

2.2.1.1.1 First Through Fourth Walls 5311-5314

The first wall 5311 constitutes one end portion of the first housing 531A in the first direction (right end in FIG. 7). The first wall 5311 faces the first frame 551A (inner surface S2) in the first direction (see FIG. 4). The first wall 5311 extends in the second direction and in a third direction. The third direction crosses both the first direction and the second direction. Preferably, the third direction be perpendicular to both the first direction and the second direction. Preferably, the third direction be an up-down direction in a state where the drum cartridge 5 is attached to the housing 2 of the image-forming apparatus 1 that is placed on the horizontal plane.

The first wall 5311 supports one end portion of the developing roller 532 in the first direction (see FIG. 4).

Specifically, the developing roller 532 includes a developing roller body 532A and a developing roller shaft 532B, as illustrated in FIGS. 3 and 4.

The developing roller body 532A extends in the first direction, as illustrated in FIG. 4. The developing roller body 532A has a cylindrical shape. The developing roller body 532A is positioned between the first wall 5311 and the second wall 5312 in the first direction. The developing roller body 532A is rotatable together with the developing roller shaft 532B.

The developing roller shaft 532B extends in the first direction, and is centered on the developing axis A2. The developing roller shaft 532B penetrates throughout the developing roller body 532A in the first direction. The developing roller shaft 532B has one end portion in the first direction that protrudes outward from one end portion of the developing roller body 532A in the first direction. The developing roller shaft 532B has another end portion in the first direction that protrudes outward from another end portion of the developing roller body 532A in the first direction. The first wall 5311 supports the one end portion of the developing roller shaft 532B in the first direction.

As illustrated in FIG. 7, the second wall 5312 constitutes another end portion of the first housing 531A in the first direction (left end in FIG. 7). The second wall 5312 is positioned apart from the first wall 5311 in the first direction. The second wall 5312 is positioned between the first wall 5311 and the second frame 551B in the first direction (see FIG. 4). The second wall 5312 faces the second frame 551B (inner surface S4) in the first direction. The second wall 5312 extends in the second direction and in the third direction.

The second wall 5312 supports the other end portion of the developing roller shaft 532B in the first direction. In this way, the developing roller shaft 532B is supported by the first housing 531A with the one end portion in the first direction of the developing roller shaft 532B supported by the first wall 5311, and with the other end portion in the first direction of the developing roller shaft 532B supported by the second wall 5312. That is, the developing roller shaft 532B is supported by the first housing 531A.

The third wall 5313 constitutes one end portion of the first housing 531A in the third direction (bottom end in FIG. 7). The third wall 5313 is positioned between the first wall 5311 and the second wall 5312 in the first direction. The third wall 5313 extends in the first direction and the second direction. The third wall 5313 has one end in the first direction that is connected to the first wall 5311. In the present embodiment, the one end in the first direction of the third wall 5313 is connected to one end portion of the first wall 5311 in the third direction (lower end in FIG. 7). The third wall 5313 has another end in the first direction that is connected to the second wall 5312. In the present embodiment, the other end in the first direction of the third wall 5313 is connected to one end of the second wall 5312 in the third direction (lower end in FIG. 7).

The fourth wall 5314 constitutes another end portion of the first housing 531A in the third direction (upper end in FIG. 7). The fourth wall 5314 is positioned apart from the third wall 5313 in the third direction. The fourth wall 5314 is positioned between the first wall 5311 and the second wall 5312 in the first direction. The fourth wall 5314 extends in the first direction and the second direction. The fourth wall 5314 has one end in the first direction that is connected to the first wall 5311. In the present embodiment, the one end in the first direction of the fourth wall 5314 is connected to another end portion of the first wall 5311 in the third direction (upper end in FIG. 7). The fourth wall 5314 has another end in the first direction that is connected to the second wall 5312. In the present embodiment, the other end in the first direction of the fourth wall 5314 is connected to another end portion of the second wall 5312 in the third direction (upper end in FIG. 7).

2.2.1.1.2 Opening 5310A

As illustrated in FIG. 3, the opening 5310A is positioned apart from the developing roller 532 in the second direction.

Specifically, as illustrated in FIG. 7, the opening 5310A is defined by a periphery 5310AE constituted by: another end of the first wall 5311 in the second direction (near end in FIG. 7); another end of the second wall 5312 in the second direction (near end in FIG. 7); another end of the third wall 5313 in the second direction (near end in FIG. 7); and another end of the fourth wall 5314 in the second direction (near end in FIG. 7). That is, the opening 5310A is open over an entire length between the first wall 5311 and the second wall 5312 in the first direction and over an entire length between the third wall 5313 and the fourth wall 5314 in the third direction.

2.2.1.2 Details of Second Housing 531B

As illustrated in FIG. 3, the second housing 531B is positioned apart from the photosensitive drum 51 in the second direction.

Figure 8:
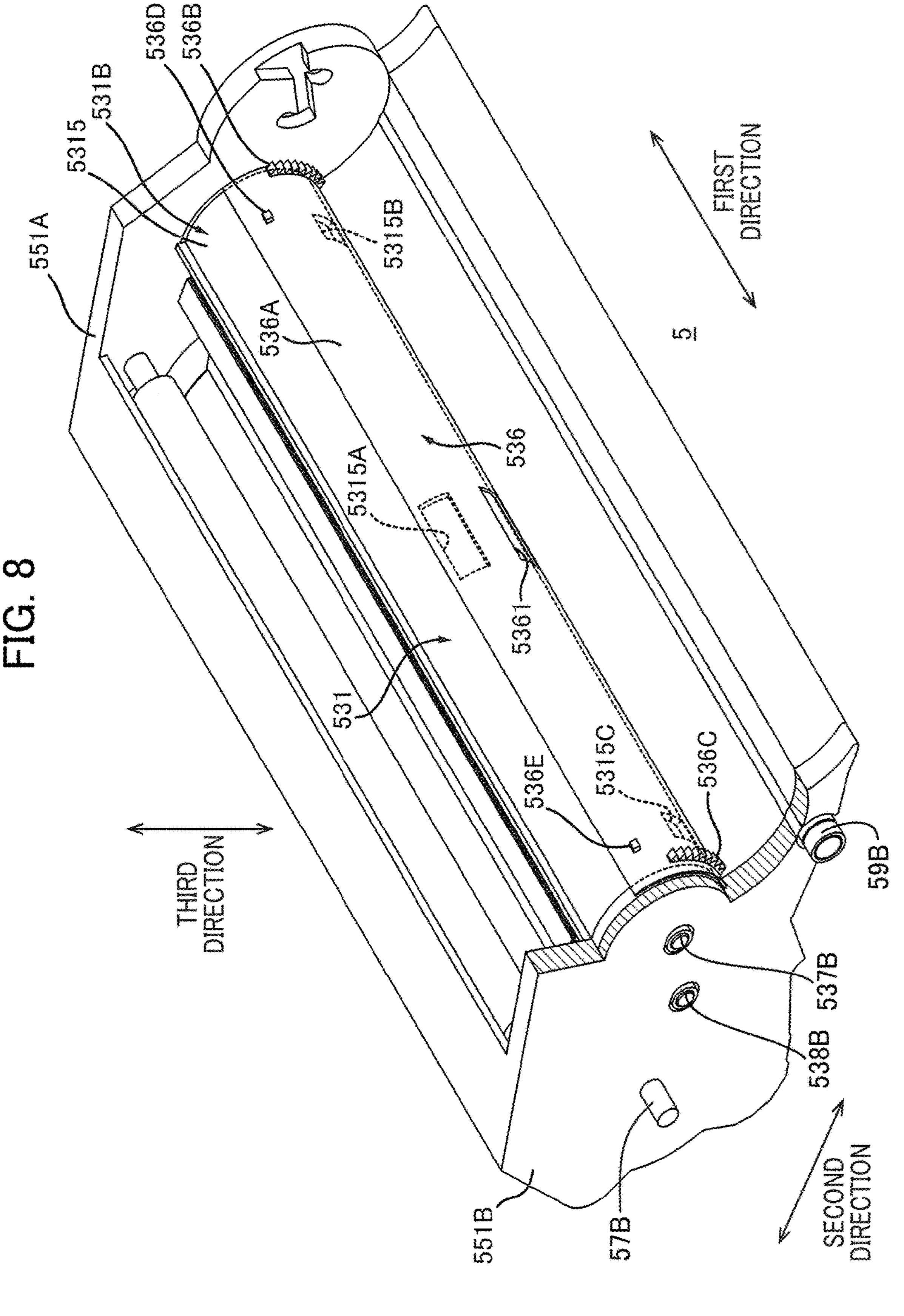
FIG. 8 is a perspective view of the drum cartridge of FIG. 3 in which a part of a second frame thereof is cut out.

As illustrated in FIG. 8, the second housing 531B is positioned between the first frame 551A and the second frame 551B in the first direction. The second housing 531B extends in the first direction. The second housing 531B has one end in the first direction that is fixed to the first frame 551A. The second frame 551B has another end in the first direction that is fixed to the second frame 551B. The second housing 531B is immovable relative to the photosensitive drum 51 (see FIG. 3). The second housing 531B has an internal space in communication with an internal space of the first housing 531A.

As illustrated in FIGS. 3, 4 and 8, the second housing 531B includes an arcuate wall 5315, and two side walls 5316A and 5316B. The second housing 531B has a semi-hollow cylindrical shape. Further, the second housing 531B has an opening 5310B (see FIG. 3).

2.2.1.2.1 Arcuate Wall 5315

As illustrated in FIG. 8, the arcuate wall 5315 is positioned between the first frame 551A and the second frame 551B in the first direction. The arcuate wall 5315 extends in the first direction and in the third direction. The arcuate wall 5315 has one end in the first direction that is fixed to the first frame 551A. The arcuate wall 5315 has another end in the first direction that is fixed to the second frame 551B. As illustrated in FIG. 3, the arcuate wall 5315 has an arcuate shape in cross-section. The arcuate wall 5315 has a first end E31 and a second end E32 in the third direction. With respect to the second direction, the first end E31 is positioned in alignment with the other end in the second direction of the third wall 5313 of the first housing 531A (right end in FIG. 3). With respect to the second direction, the second end E32 is positioned in alignment with the other end in the second direction of the fourth wall 5314 of the first housing 531A (right end in FIG. 3).

As illustrated in FIG. 8, the arcuate wall 5315 has an inlet port 5315A and two outlet ports 5315B and 5315C. In other words, the second housing 531B has the inlet port 5315A and the two outlet ports 5315B and 5315C.

The inlet port 5315A is positioned at a center portion of the second housing 531B in the first direction. As illustrated in FIG. 3, the inlet port 5315A is positioned between the first housing 531A and the locking part 555A in the second direction. The toner stored in the toner cartridge 6 is configured to be introduced through the inlet port 5315A in a state where the drum cartridge 5 and the toner cartridge 6 are coupled to each other. That is, the inlet port 5315A is configured to allow toner to pass therethrough.

As illustrated in FIG. 8, the outlet port 5315B is positioned apart from the inlet port 5315A in the first direction. The outlet port 5315B is positioned between the inlet port 5315A and the first frame 551A in the first direction. The toner in the developing housing 531 can pass through the outlet port 5315B in the state where the toner cartridge 6 is coupled to the drum cartridge 5. That is, the outlet port 5315B allows the toner in the developing housing 531 to be discharged therethrough out of the developing housing 531. The outlet port 5315B is positioned below the inlet port 5315A in the state where the drum cartridge 5 and the toner cartridge 6 are attached to the housing 2 of the image-forming apparatus 1. The outlet port 5315B is open downward in the state where the drum cartridge 5 and the toner cartridge 6 are attached to the housing 2.

The outlet port 5315C is positioned opposite the outlet port 5315B with respect to the inlet port 5315A in the first direction. The outlet port 5315C is positioned apart from the inlet port 5315A in the first direction. The outlet port 5315C is positioned between the inlet port 5315A and the second frame 551B in the first direction. The toner in the developing housing 531 can pass through the outlet port 5315C in the state where the drum cartridge 5 and the toner cartridge 6 are coupled to each other. That is, the outlet port 5315C allows the toner in the developing housing 531 to be discharged therethrough out of the developing housing 531. The outlet port 5315C is positioned below the inlet port 5315A in the state where the drum cartridge 5 and the toner cartridge 6 are attached to the housing 2 of the image-forming apparatus 1.

2.2.1.2.2 Side Walls 5316A, 5316B

As illustrated in FIG. 4, the side wall 5316A constitutes one end portion of the second housing 531B in the first direction. The side wall 5316A faces the first frame 551A (inner surface S2) in the first direction. With respect to the second direction, the side wall 5316A is in alignment with the other end in the second direction of the first wall 5311 of the first housing 531A.

The side wall 5316B constitutes another end portion of the second housing 531B in the first direction. The side wall 5316B is positioned apart from the side wall 5316A in the first direction. The side wall 5316B is positioned between the side wall 5316A and the second frame 551B in the first direction. The side wall 5316B faces the second frame 551B in the first direction. With respect to the second direction, the side wall 5316B is in alignment with the other end in the second direction of the second wall 5312 of the first housing 531A.

2.2.1.2.3 Opening 5310B

The opening 5310B is defined by a periphery 5310BE (see FIG. 3) constituted by: one end in the second direction of the side wall 5316A (see FIG. 4); one end in the second direction of the side wall 5316B (see FIG. 4); the first end E31 in the second direction of the arcuate wall 5315 (see FIG. 3); and the second end E32 in the second direction of the arcuate wall 5315 (see FIG. 3). That is, the opening 5310B is open over an entire length between the side wall 5316A and the side wall 5316B in the first direction and over an entire length between the first end E31 and the second end E32 of the arcuate wall 5315 in the third direction.

2.2.1.3 Gasket 531C

As illustrated in FIG. 3, the gasket 531C is interposed between the first housing 531A and the second housing 531B in the second direction. As illustrated in FIG. 7, the gasket 531C has a frame-like configuration. Specifically, the gasket 531C includes a first gasket part 531CA, a second gasket part 531CB, a third gasket part 531CC, and a fourth gasket part 531CD.

The first gasket part 531CA constitutes one end portion of the gasket 531C in the first direction. The first gasket part 531CA extends in the third direction.

The second gasket part 531CB constitutes another end portion of the gasket 531C in the first direction. The second gasket part 531CB is positioned apart from the first gasket part 531CA in the first direction. The second gasket part 531CB extends in the third direction.

The third gasket part 531CC constitutes one end portion of the gasket 531C in the third direction (lower end in FIG. 7). As illustrated in FIG. 3, the third gasket part 531CC is positioned opposite the opening 5310B with respect to the first end E31 of the arcuate wall 5315 in the third direction. As illustrated in FIG. 7, the third gasket part 531CC is positioned between the first gasket part 531CA and the second gasket part 531CB in the first direction. The third gasket part 531CC extends in the first direction. The third gasket part 531CC has one end portion in the first direction that is connected to one end portion of the first gasket part 531CA in the third direction. The third gasket part 531CC has another end portion in the first direction that is connected to one end portion of the second gasket part 531CB in the third direction.

The fourth gasket part 531CD constitutes another end portion of the gasket 531C in the third direction (upper end in FIG. 7). The fourth gasket part 531CD is positioned apart from the third gasket part 531CC in the third direction. The fourth gasket part 531CD is positioned between the first gasket part 531CA and the second gasket part 531CB in the first direction. The fourth gasket part 531CD extends in the first direction. The fourth gasket part 531CD has one end portion in the first direction that is connected to another end portion of the first gasket part 531CA in the third direction. The fourth gasket part 531CD has another end portion in the first direction that is connected to another end portion of the second gasket part 531CB in the third direction.

With respect the second direction, the first gasket part 531CA of the gasket 531C is interposed between the first wall 5311 of the first housing 531A and the side wall 5316A of the second housing 531B (see FIG. 4). In the second direction, the second gasket part 531CB of the gasket 531C is interposed between the second wall 5312 of the first housing 531A and the side wall 5316B of the second housing 531B (see FIG. 4). In the second direction, the third gasket part 531CC of the gasket 531C is interposed between the third wall 5313 of the first housing 531A and the first end E31 of the arcuate wall 5315 of the second housing 531B (see FIG. 3). In the second direction, the fourth gasket part 531CD of the gasket 531C is interposed between the fourth wall 5314 of the first housing 531A and the second end E32 of the arcuate wall 5315 of the second housing 531B (see FIG. 3).

Figure 9:
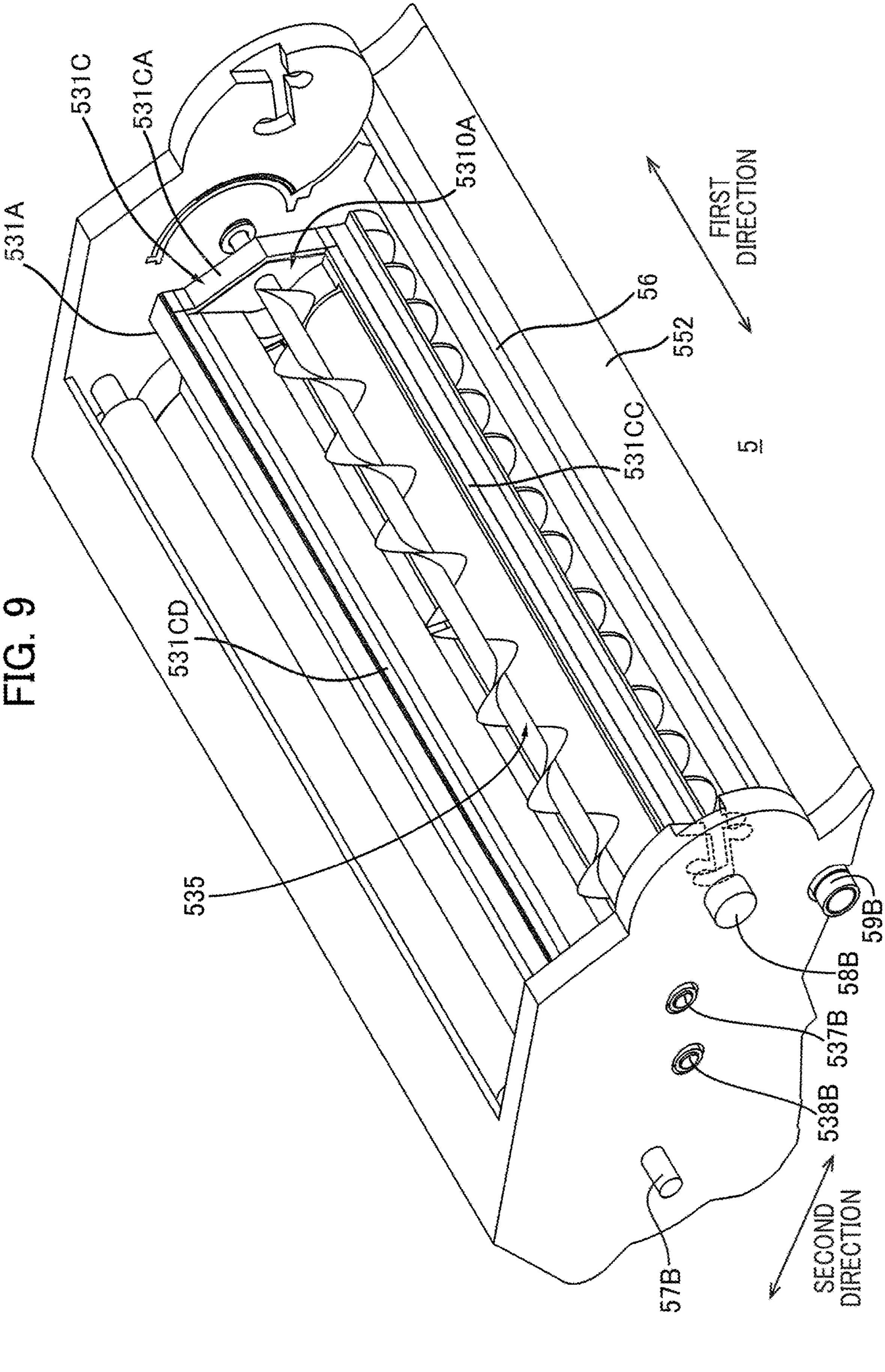
FIG. 9 is a perspective view of the drum cartridge of FIG. 3 in a state where a second housing is removed.

As illustrated in FIG. 9, the gasket 531C is in contact with the periphery 5310AE (FIG. 7) defining the opening 5310A of the first housing 531A.

Specifically, the first gasket part 531CA is in contact with the other end in the second direction of the first wall 5311 (see FIG. 7) of the first housing 531A. The second gasket part 531CB is in contact with the other end in the second direction of the second wall 5312 (see FIG. 7). The third gasket part 531CC is in contact with the other end in the second direction of the third wall 5313 (see FIG. 7). The fourth gasket part 531CD is in contact with the other end in the second direction of the fourth wall 5314 (see FIG. 7).

Further, as illustrated in FIG. 3, the gasket 531C is in contact with the periphery 5310BE defining the opening 5310B of the second housing 531B.

Specifically, the first gasket part 531CA is in contact with the one end in the second direction of the side wall 5316A (see FIG. 4) of the second housing 531B. The second gasket part 531CB is in contact with the one end in the second direction of the side wall 5316B (see FIG. 4). The third gasket part 531CC is in contact with the first end E31 in the second direction of the arcuate wall 5315. The fourth gasket part 531CD is in contact with the second end E32 in the second direction of the arcuate wall 5315. That is, the gasket 531C is in contact with the periphery 5310AE defining the opening 5310A of the first housing 531A and the periphery 5310BE defining the opening 5310B of the second housing 531B.

With this structure, the gasket 531C seals a boundary between the periphery 5310AE of the opening 5310A and the periphery 5310BE of the opening 5310B. That is, the gasket 531C seals a boundary between the first housing 531A and the second housing 531B.

The gasket 531C is elastically deformable in accordance with displacement of the first housing 531A relative to the photosensitive drum 51. The elastic deformation of the gasket 531C can restrain toner leakage through the boundary between the first housing 531A and the second housing 531B when the first housing 531A moves relative to the photosensitive drum 51. The gasket 531C may be a sponge, for example.

2.2.2 Supply Roller 533

The supply roller 533 is configured to supply toner to the developing roller 532 within the developing housing 531. Specifically, the supply roller 533 is configured to supply toner to the developing roller 532 inside the first housing 531A of the developing housing 531. The supply roller 533 is positioned opposite the photosensitive drum 51 with respect to the developing roller 532 in the second direction (see FIG. 3). The supply roller 533 is in contact with the developing roller 532. The supply roller 533 is rotatable about a supply roller axis A3. The supply roller axis A3 extends in the first direction. The supply roller 533 extends in the first direction. The supply roller 533 has a solid cylindrical shape.

The supply roller 533 has one end portion in the first direction that is supported by the first wall 5311 (see FIG. 4). The supply roller 533 has another end portion in the first direction that is supported by the second wall 5312 (see FIG.

4). In this way, the supply roller 533 is supported by the first housing 531A with the one end portion in the first direction of the supply roller 533 supported by the first wall 5311 and with the other end portion in the first direction of the supply roller 533 supported by the second wall 5312.

2.2.3 Layer Thickness Regulation Blade 534

The layer thickness regulation blade 534 is configured to regulate a thickness of the toner layer formed on the developing roller 532. The layer thickness regulation blade 534 is in contact with the developing roller 532. The layer thickness regulation blade 534 is supported by the first housing 531A of the developing housing 531.

2.2.4 Conveying Member 535

As illustrated in FIGS. 3 and 7, the conveying member 535 is positioned inside the developing housing 531. Specifically, the conveying member 535 is positioned in the first housing 531A of the developing housing 531. As illustrated in FIG. 3, the conveying member 535 is positioned apart from the supply roller 533 in the third direction. The conveying member 535 is configured to convey the toner within the developing housing 531 in the first direction. The conveying member 535 is rotatable about an axis A4 extending in the first direction. In the present embodiment, an auger screw is employed as the conveying member 535.

As illustrated in FIG. 7, the conveying member 535 includes a shaft part extending in the first direction. One end portion of the shaft part in the first direction is supported by the first wall 5311. Another end portion of the shaft part in the first direction is supported by the second wall 5312. In this way, the conveying member 535 is supported by the first housing 531A with the one end portion in the first direction of the shaft part supported by the first wall 5311 and with the other end portion in the first direction of the shaft part supported by the second wall 5312. That is, the first housing 531A supports the conveying member 535.

The conveying member 535 is configured to convey the toner inside the developing housing 531 in the first direction from the inlet port 5315A (see FIG. 8) toward the respective outlet ports 5315B and 5315C (see FIG. 8).

Specifically, the conveying member 535 also includes a first conveying part 535A and a second conveying part 535B.

The first conveying part 535A is provided on the shaft part in a helical manner to extend in the first direction from a center in the first direction of the conveying member 535 to the first wall 5311 of the first housing 531A. The first conveying part 535A is configured to convey the toner inside the developing housing 531 in the first direction from the inlet port 5315A toward the outlet port 5315B.

The second conveying part 535B is provided on the shaft part in a helical manner to extend in the first direction from the center in the first direction of the conveying member 535 to the second wall 5312 of the first housing 531A. The second conveying part 535B is configured to convey toner inside the developing housing 531 in the first direction from the inlet port 5315A toward the outlet port 5315C.

2.2.5 Developing Shutter 536

Figure 10:
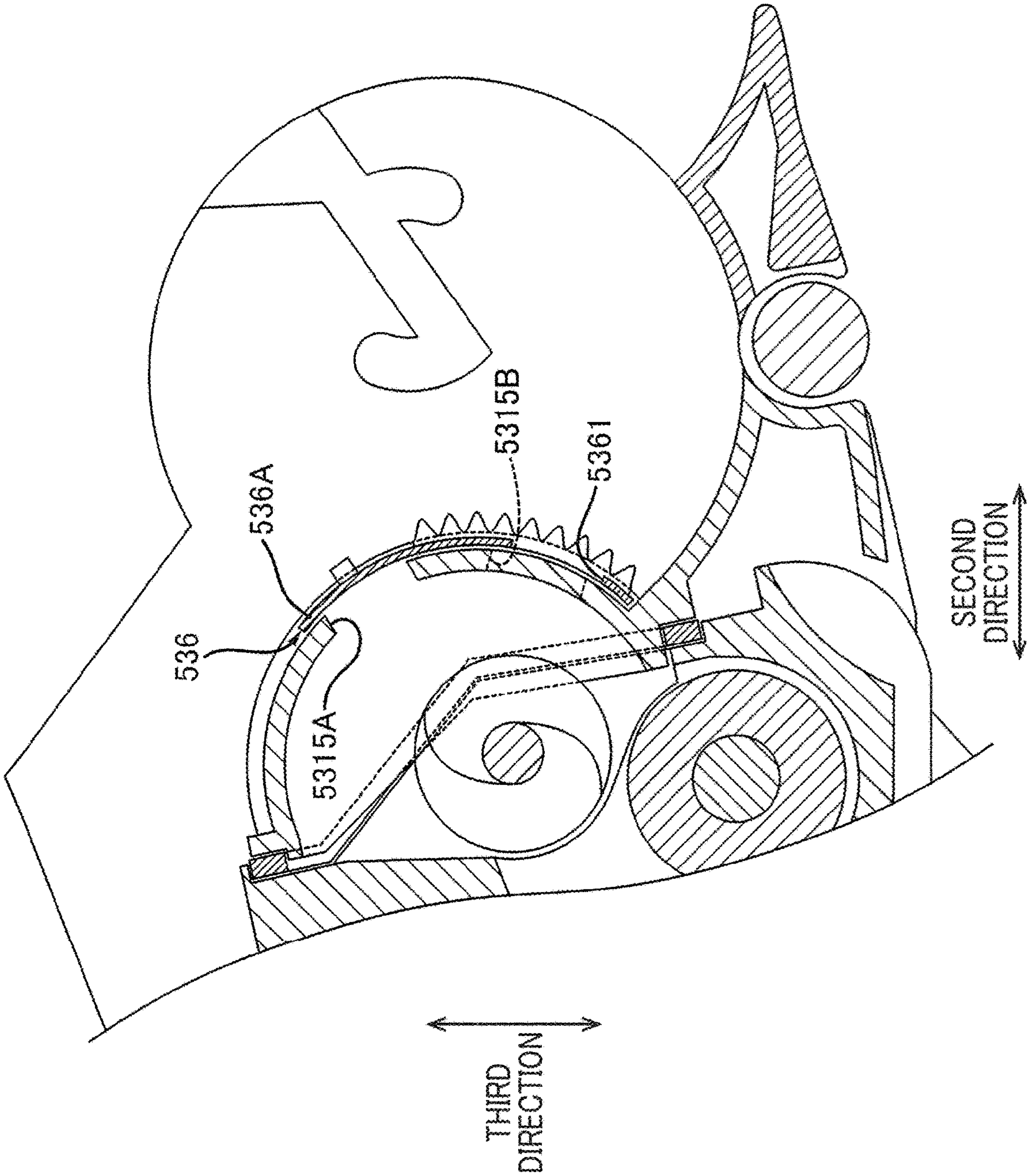
FIG. 10 is a partial cross-sectional view of the drum cartridge of FIG. 3 in a state where a developing shutter is at a developing-shutter closing position.
Figure 11:
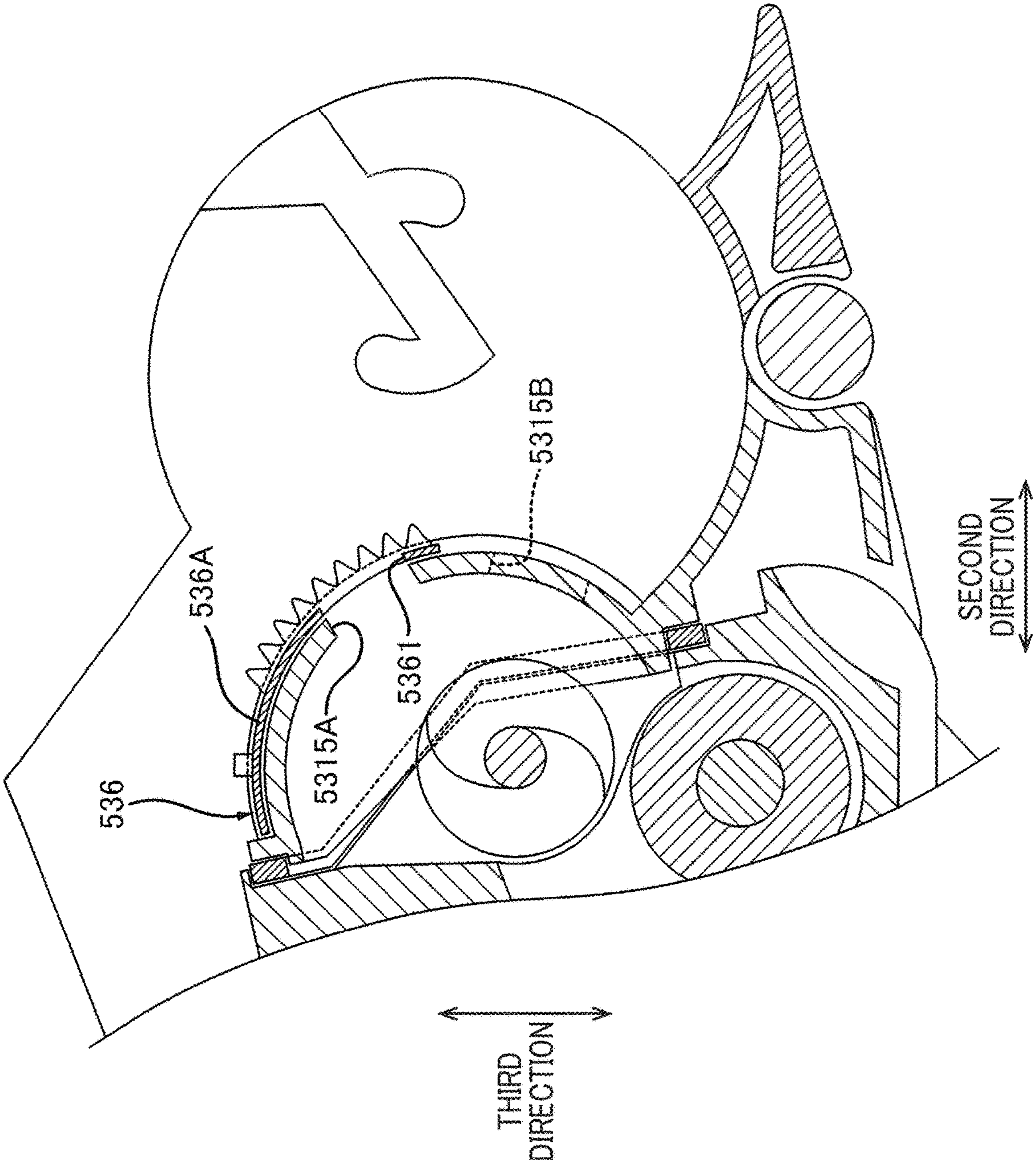
FIG. 11 is a partial cross-sectional view of the drum cartridge of FIG. 3 in a state where the developing shutter is at a developing-shutter opening position.

As illustrated in FIGS. 10 and 11, the developing shutter 536 is configured to open and close the inlet port 5315A and the outlet ports 5315B and 5315C (see FIG. 8). Specifically, the developing shutter 536 is movable between: a developing-shutter closing position (illustrated in FIG. 10) where the developing shutter 536 closes the inlet port 5315A and the outlet ports 5315B and 5315C; and a developing-shutter opening position (illustrated in FIG. 11) where the developing shutter 536 opens the inlet port 5315A and the outlet ports 5315B and 5315C.

As illustrated in FIG. 8, the developing shutter 536 includes a shutter body 536A, two engagement parts 536B and 536C, and another two engagement parts 536D and 536E.

2.2.5.1 Shutter Body 536A

The shutter body 536A extends in the first direction. As illustrated in FIG. 4, the shutter body 536A has one end portion in the first direction that is fitted with the shutter guide 557A of the first frame 551A. The shutter body 536A has another end portion in the first direction that is fitted with the shutter guide 557B of the second frame 551B. The shutter body 536A is movable along the shutter guides 557A and 557B. Hence, the developing shutter 536 is movable between the developing-shutter closing position (FIG. 10) and the developing-shutter opening position (FIG. 11).

The shutter body 536A has a shutter opening 5361 (see FIG. 8). The shutter opening 5361 is positioned at a center portion in the first direction of the shutter body 536A. As illustrated in FIG. 10, the shutter opening 5361 is positioned away from the inlet port 5315A in a state where the developing shutter 536 is at the developing-shutter closing position. Hence, the shutter opening 5361 is not in communication with the inlet port 5315A in the state where the developing shutter 536 is at the developing-shutter closing position. The shutter body 536A thus closes the inlet port 5315A. In other words, the developing shutter 536 closes off the inlet port 5315A.

As illustrated in FIG. 11, the shutter opening 5361 is in communication with the inlet port 5315A in a state where the developing shutter 536 is at the developing-shutter opening position. Hence, the developing shutter 536 opens the inlet port 5315A. Further, the developing shutter 536 is positioned apart from the outlet port 5315B in the state where the developing shutter 536 is at the developing-shutter opening position. Thus, the developing shutter 536 also opens the outlet port 5315B. Likewise, the developing shutter 536 is positioned apart from the outlet port 5315C in the state where the developing shutter 536 is at the developing-shutter opening position. Thus, the developing shutter 536 also opens the outlet port 5315C.

2.2.5.2 Engagement Parts 536B, 536C

As illustrated in FIG. 8, the engagement part 536B is positioned on one end portion of the shutter body 536A in the first direction. The engagement part 536B is positioned between the first frame 551A and the shutter opening 5361 in the first direction. The engagement part 536B is positioned apart from the shutter opening 5361 in the first direction. In the present embodiment, the engagement part 536B is in a form of a gear having a plurality of gear teeth. The plurality of gear teeth of the engagement part 536B is arrayed with one another in a moving direction of the developing shutter 536.

The engagement part 536C is positioned on another end portion of the shutter body 536A in the first direction. The engagement part 536C is positioned opposite the engagement part 536B with respect to the shutter opening 5361 in the first direction. The engagement part 536C is positioned apart from the shutter opening 5361 in the first direction. The engagement part 536C is positioned between the shutter opening 5361 and the second frame 551B in the first direction. In the present embodiment, the engagement part 536C is in a form of a gear having a plurality of gear teeth. The plurality of gear teeth of the engagement part 536C is arrayed with one another in the moving direction of the developing shutter 536.

2.2.5.3 Engagement Parts 536D, 536E

The engagement part 536D is positioned between the first frame 551A and the shutter opening 5361 in the first direction. The engagement part 536D is positioned apart from the shutter opening 5361 in the first direction. The engagement part 536D is positioned between the shutter opening 5361 and the engagement part 536B in the first direction. The engagement part 536D is positioned apart from the engagement part 536B in the first direction. In the present embodiment, the engagement part 536D is in a form of a protrusion protruding from the shutter body 536A.

The engagement part 536E is positioned between the second frame 551B and the shutter opening 5361 in the first direction. The engagement part 536E is positioned opposite the engagement part 536D with respect to the shutter opening 5361 in the first direction. The engagement part 536E is positioned apart from the shutter opening 5361 in the first direction. The engagement part 536E is positioned between the shutter opening 5361 and the engagement part 536C in the first direction. The engagement part 536E is positioned apart from the engagement part 536C in the first direction. In the present embodiment, the engagement part 536E is in a form of a protrusion protruding from the shutter body 536A.

2.2.6 Protrusions 537A, 538A

As illustrated in FIG. 5, the protrusion 537A is positioned apart from the photosensitive drum 51 in the connecting direction from the axis A1 to the developing axis A2. As illustrated in FIG. 4, the protrusion 537A is positioned at one end face of the first housing 531A in the first direction. In the present embodiment, the protrusion 537A is the one end portion of the shaft part of the conveying member 535 in the first direction (see FIG. 7). The protrusion 537A has a solid cylindrical shape. The protrusion 537A extends in the first direction. As illustrated in FIG. 5, the protrusion 537A received in the elongated through-hole 552A of the first frame 551A such that the protrusion 537A is movable relative to the through-hole 552A.

Alternatively, the protrusion 537A may be a protrusion extending from the one end face in the first direction of the first housing 531A. Here, the protrusion may be integral with or attached to the one end face in the first direction of the first housing 531A, provided that the conveying member 535 is rotatably supported by the first frame 551A.

The protrusion 538A is positioned between the photosensitive drum 51 and the protrusion 537A in the connecting direction from the axis A1 to the developing axis A2. In the present embodiment, the protrusion 538A is the one end portion in the first direction of the developing roller shaft 532B (see FIG. 3) of the developing roller 532. The protrusion 538A has a solid cylindrical shape. The protrusion 538A extends in the first direction. As illustrated in FIG. 5, the protrusion 538A is received in the elongated through-hole 553A of the first frame 551A such that the protrusion 538A is movable relative to the through-hole 553A.

Alternatively, the protrusion 538A may be a protrusion extending from the one end face in the first direction of the first housing 531A. Here, the protrusion may be integral with or attached to the one end face in the first direction of the first housing 531A, provided that the developing roller 532 is rotatably supported by the first frame 551A.

2.2.7 Protrusions 537B, 538B

As illustrated in FIG. 6, the protrusion 537B is positioned apart from the photosensitive drum 51 in the connecting direction from the axis A1 to the developing axis A2. As illustrated in FIG. 4, the protrusion 537B is positioned at another end face of the first housing 531A in the first direction. In the present embodiment, the protrusion 537B is another end portion of the shaft part of the conveying member 535 in the first direction. The protrusion 537B has a solid cylindrical shape. The protrusion 537B extends in the first direction. As illustrated in FIG. 6, the protrusion 537B is received in the elongated through-hole 552B of the second frame 551B such that the protrusion 537B is movable relative to the through-hole 552B.

Alternatively, the protrusion 537B may be a protrusion extending from the other end face in the first direction of the first housing 531A. Here, the protrusion may be integral with or attached to the other end face in the first direction of the first housing 531A, provided that the conveying member 535 is rotatably supported by the first housing 531A.

The protrusion 538B is positioned between the photosensitive drum 51 and the protrusion 537B in the connecting direction from the axis A1 to the developing axis A2. In the present embodiment, the protrusion 538A is another end portion in the first direction of the developing roller shaft 532B (see FIG. 3) of the developing roller 532. The protrusion 538B has a solid cylindrical shape. The protrusion 538B extends in the first direction. The protrusion 538B is received in the elongated through-hole 553B of the second frame 551B such that the protrusion 538B is movable relative to the through-hole 553B.

Alternatively, the protrusion 538B may be a protrusion extending from another end face of the first housing 531A in the first direction. Here, the protrusion may be integral with or attached to the other end face of the first housing 531A, provided that the developing roller 532 is rotatably supported by the first housing 531A.

In this way, the first housing 531A is movable relative to the photosensitive drum 51 in the connecting direction from the axis A1 to the developing axis A2 due to the fitting engagements between the protrusion 537A and the through-hole 552A, between the protrusion 538A and the through-hole 553A, between the protrusion 537B and the through-holes 552B, and between the protrusion 538B and the through-hole 553B.

2.3 Counter Roller 56

As illustrated in FIG. 3, the counter roller 56 is positioned at another end portion of the drum cartridge 5 in the second direction. The counter roller 56 is positioned apart from the photosensitive drum 51 in the second direction. The counter roller 56 is positioned at one end portion of the supporting portion 552 at one side in the third direction, i.e., at a lower end portion of the supporting portion 552 in FIG. 3.

As illustrated in FIG. 1, the counter roller 56 contacts the conveyer roller 8 in the state where the drum cartridge 5 is attached to the housing 2. With this configuration, the conveyer roller 8 can convey, in cooperation with the counter roller 56, the sheet S supplied from the sheet accommodating unit 4 toward the photosensitive drum 51 in the state where the drum cartridge 5 is attached to the housing 2.

2.4 Protrusions 57A, 57B, 58A, 58B, 59A, 59B

As illustrated in FIG. 4, the protrusion 57A is positioned opposite the second frame 551B with respect to the first frame 551A in the first direction. The protrusion 57A extends in the first direction. The protrusion 57A is centered on the axis A1. The protrusion 57A has a solid cylindrical shape. In the present embodiment, the protrusion 57A is one end portion of a shaft of the photosensitive drum 51 in the first direction.

Alternatively, the protrusion 57A may a protrusion extending outward from the outer surface S1 of the first frame 551A in the first direction. The protrusion may be integral with or attached to the outer surface S1, provided that the photosensitive drum 51 is rotatably supported by the first frame 551A.

The protrusion 57B is positioned opposite the first frame 551A with respect to the second frame 551B in the first direction. The protrusion 57B extends in the first direction, and is centered on the axis A1. The protrusion 57B has a solid cylindrical shape. In the present embodiment, the protrusion 57B is another end portion of the shaft of the photosensitive drum 51 in the first direction.

Alternatively, the protrusion 57B may be a protrusion extending from the outer surface S3 of the second frame 551B in the first direction. The protrusion may be integral with or attached to the outer surface S3, provided that the photosensitive drum 51 is rotatably supported by the second frame 551B.

The protrusion 58A is positioned apart from the protrusion 57A in the second direction. The protrusion 58A is positioned opposite the protrusion 57A with respect to the developing housing 531 in the second direction. The protrusion 58A is positioned opposite the second frame 551B with respect to the first frame 551A in the first direction. The protrusion 58A extends in the first direction. The protrusion 58A has a solid cylindrical shape. The protrusion 58A extends from the outer surface S1 of the first frame 551A. The protrusion 58A may be integral with or attached to the outer surface S1 of the first frame 551A.

The protrusion 58B is positioned apart from the protrusion 57B in the second direction. The protrusion 58B is positioned opposite the protrusion 57B with respect to the developing housing 531 in the second direction. The protrusion 58B is positioned opposite the first frame 551A with respect to the second frame 551B in the first direction. The protrusion 58B extends in the first direction. The protrusion 58B has a solid cylindrical shape. The protrusion 58B extends from the outer surface S3 of the second frame 551B in the first direction. The protrusion 58B may be integral with or attached to the outer surface S3 of the second frame 551B.

As illustrated in FIG. 5, the protrusion 59A is positioned apart from the protrusion 58A in the third direction. The protrusion 59A faces one end of the protrusion 58A at one side in the third direction. That is, the protrusion 59A is positioned below the protrusion 58A in FIG. 5. The protrusion 59A is positioned apart from the protrusion 57A in the second direction. As illustrated in FIG. 4, the protrusion 59A is positioned opposite the second frame 551B with respect to the first frame 551A in the first direction. The protrusion 59A extends in the first direction. The protrusion 59A has a solid cylindrical shape. In the present embodiment, the protrusion 59A is one end portion of the counter roller 56 in the first direction.

Alternatively, the protrusion 59A may be a protrusion extending from the outer surface S1 of the first frame 551A. The protrusion may be integral with or attached to the outer surface S1 of the first frame 551A, provided that the counter roller 56 is rotatable relative to the first frame 551A.

As illustrated in FIGS. 6 and 9, the protrusion 59B is positioned apart from the protrusion 58B in the third direction. The protrusion 59B faces one end of the protrusion 58B at one side in the third direction. That is, the protrusion 59B is positioned below the protrusion 58B in FIG. 9. The protrusion 59B is positioned apart from the protrusion 57B in the second direction. As illustrated in FIG. 4, the protrusion 59B is positioned opposite the first frame 551A with respect to the second frame 551B in the first direction. The protrusion 59B extends in the first direction. The protrusion 59B has a solid cylindrical shape. In the present embodiment, the protrusion 59B is another end portion of the counter roller 56 in the first direction.

Alternatively, the protrusion 59B may be a protrusion extending from the outer surface S3 of the second frame 551B. The protrusion may be integral with or attached to the outer surface S3 of the second frame 551B, provided that the counter roller 56 is rotatable relative to the second frame 551B.

3. Details of Toner Cartridge 6

The toner cartridge 6 will be described in detail with reference to FIG. 1 and FIGS. 12 through 19. In the following description, the first direction, the second direction, and the third direction will be referred to based on an assumption that the toner cartridge 6 is coupled to the drum cartridge 5 and both the drum cartridge 5 and the toner cartridge 6 are attached to the housing 2.

Figure 12:
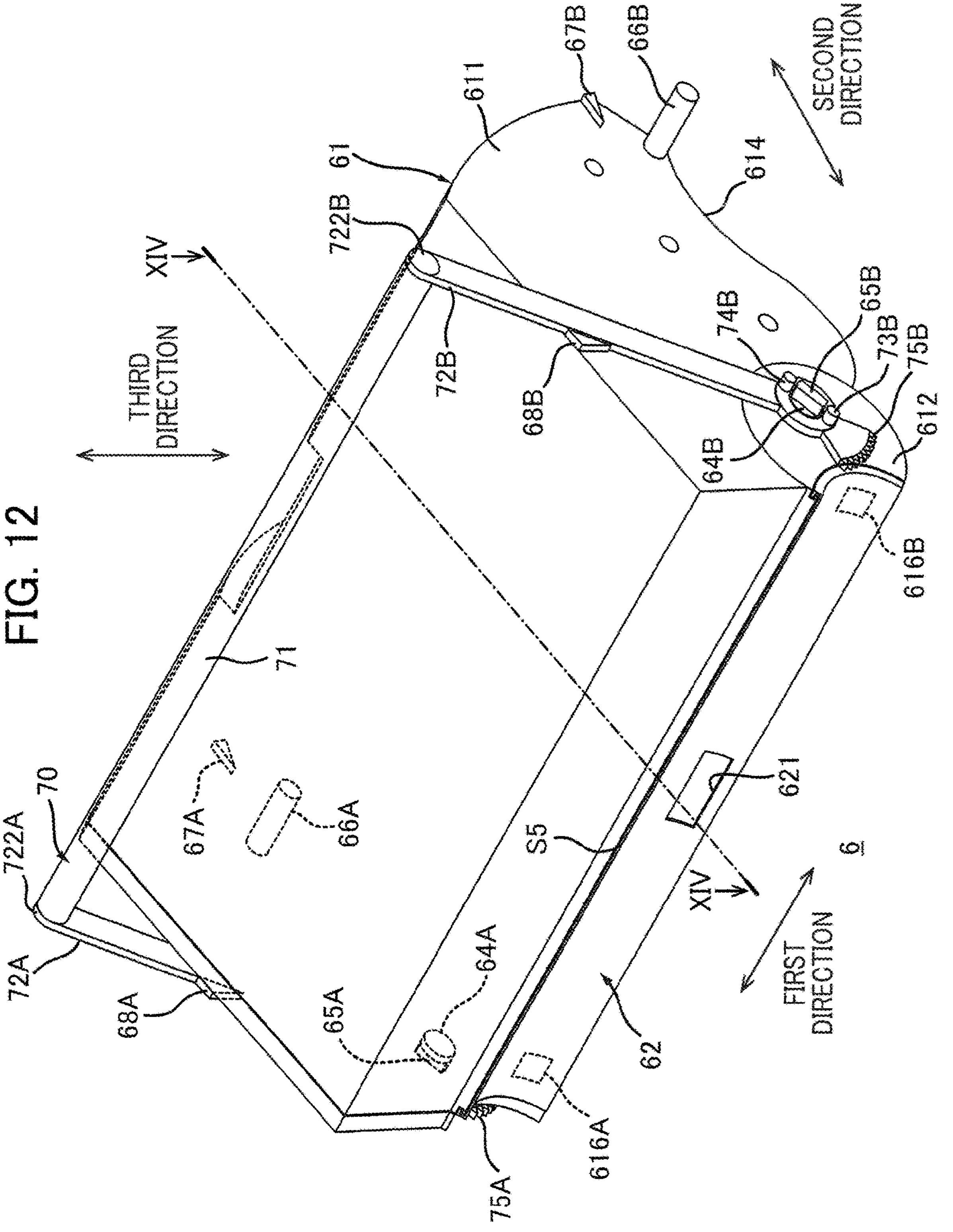
FIG. 12 is a perspective view of the toner cartridge.

As illustrated in FIG. 12, the toner cartridge 6 includes a toner casing 61, a toner shutter 62, a plurality of agitators 63A, 63B, 63C and 63D (see FIGS. 13 and 14), two supporting portions 64A and 64B, two ribs 65A and 65B, two protrusions 66A and 66B, two first stoppers 67A and 67B, two second stoppers 68A and 68B, and a lever 70.

3.1 Toner Casing 61

The toner casing 61 is configured to store toner therein. The toner casing 61 includes a first storage portion 611, the second storage portion 612, a partition wall 613 (see FIGS. 13 and 14), and a sheet guide 614. In other words, the toner cartridge 6 includes the first storage portion 611, the second storage portion 612, the partition wall 613, and the sheet guide 614.

3.1.1 First Storage Portion 611

The first storage portion 611 is configured to store therein toner. The first storage portion 611 extends in the first direction. The first storage portion 611 has a box-like shape. The first storage portion 611 can store a larger amount of toner therein than the second storage portion 612 can. This structure enables the toner cartridge 6 to have an enlarged capacity to store toner therein.

3.1.2 Second Storage Portion 612

Figure 14:
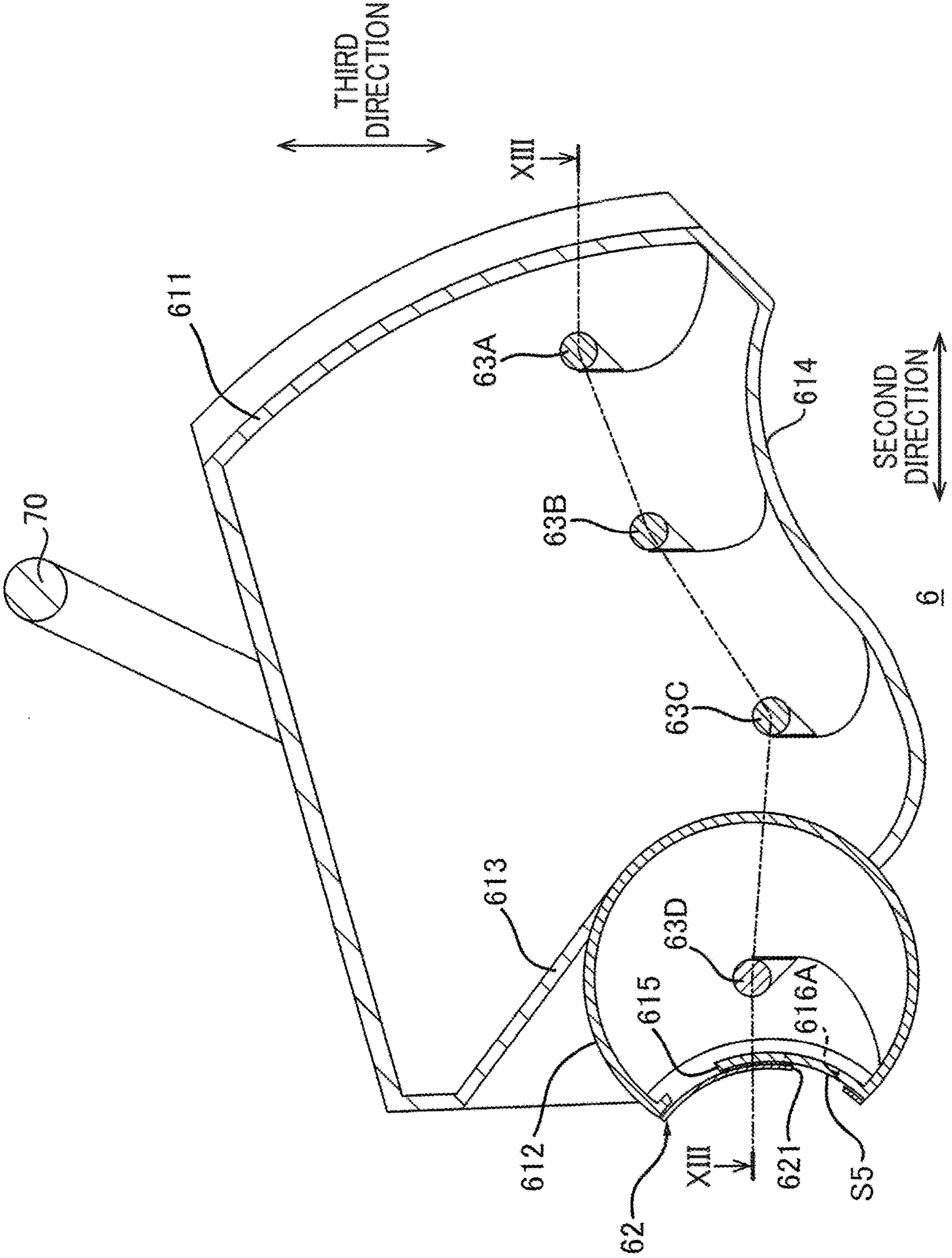
FIG. 14 is a cross-sectional view of the toner cartridge taken along a line XIV-XIV in FIG. 12 in a state where a toner shutter is at a toner-shutter closing position.
Figure 15:
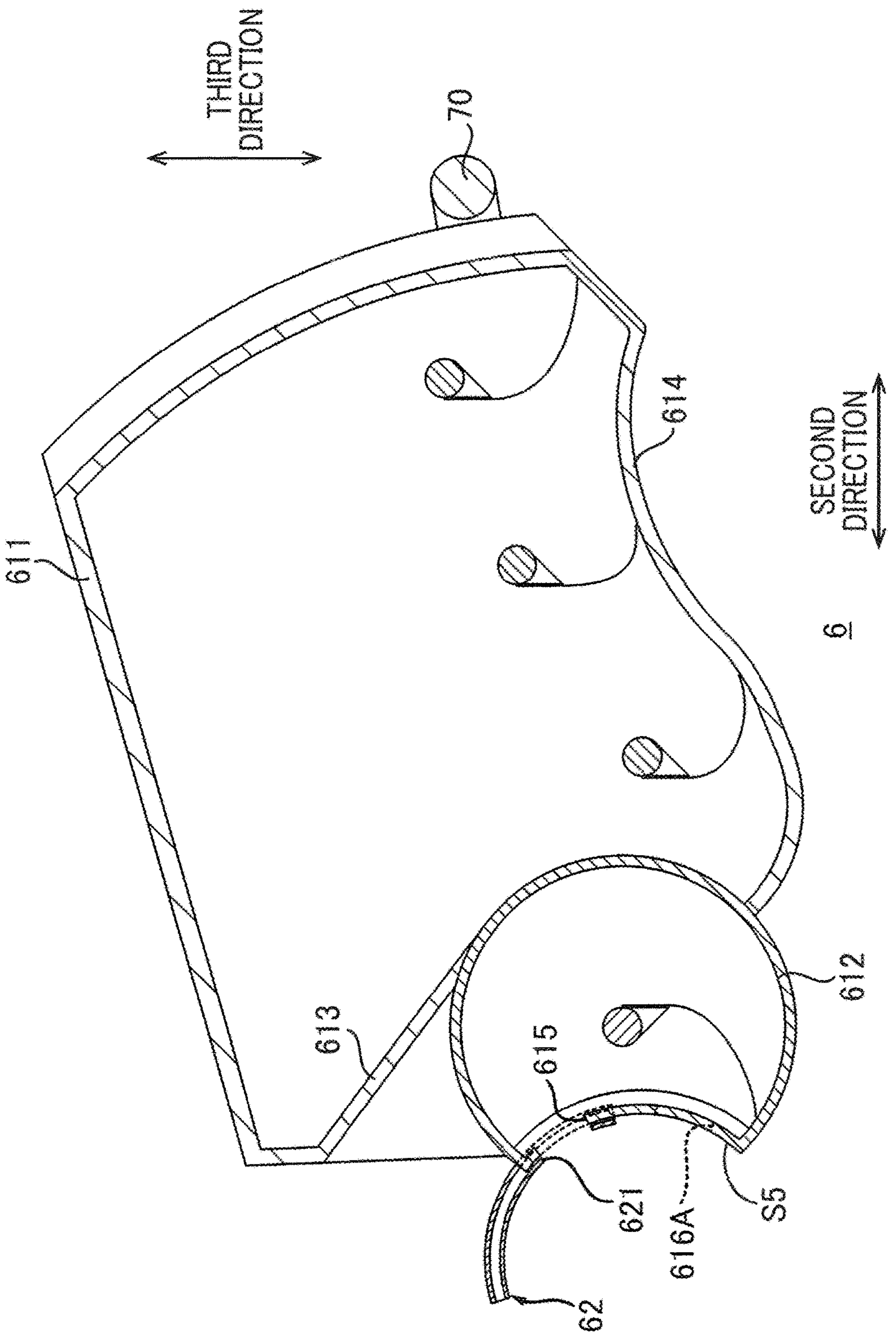
FIG. 15 is a cross-sectional view of the toner cartridge taken along the line XIV-XIV in FIG. 12 in a state where the toner shutter is at a toner-shutter opening position.

The second storage portion 612 constitutes one end portion of the toner cartridge 6 in the second direction. The second storage portion 612 extends in the first direction. The second storage portion 612 has a hollow sleeve-like shape. The second storage portion 612 has an outer surface S5 extending in the first direction. As illustrated in FIGS. 14 and 15, the outer surface S5 has an arcuate shaped cross-section. The second storage portion 612 can store a larger amount of toner therein than the developing housing 531 can (see FIG. 3). Hence, the second storage portion 612 can store therein a sufficient amount of toner to be supplied to the developing housing 531.

As illustrated in FIG. 1, the second storage portion 612 is positioned between the developing housing 531 of the drum cartridge 5 and the first storage portion 611 in the state where the toner cartridge 6 is coupled to the drum cartridge 5.

Figure 13:
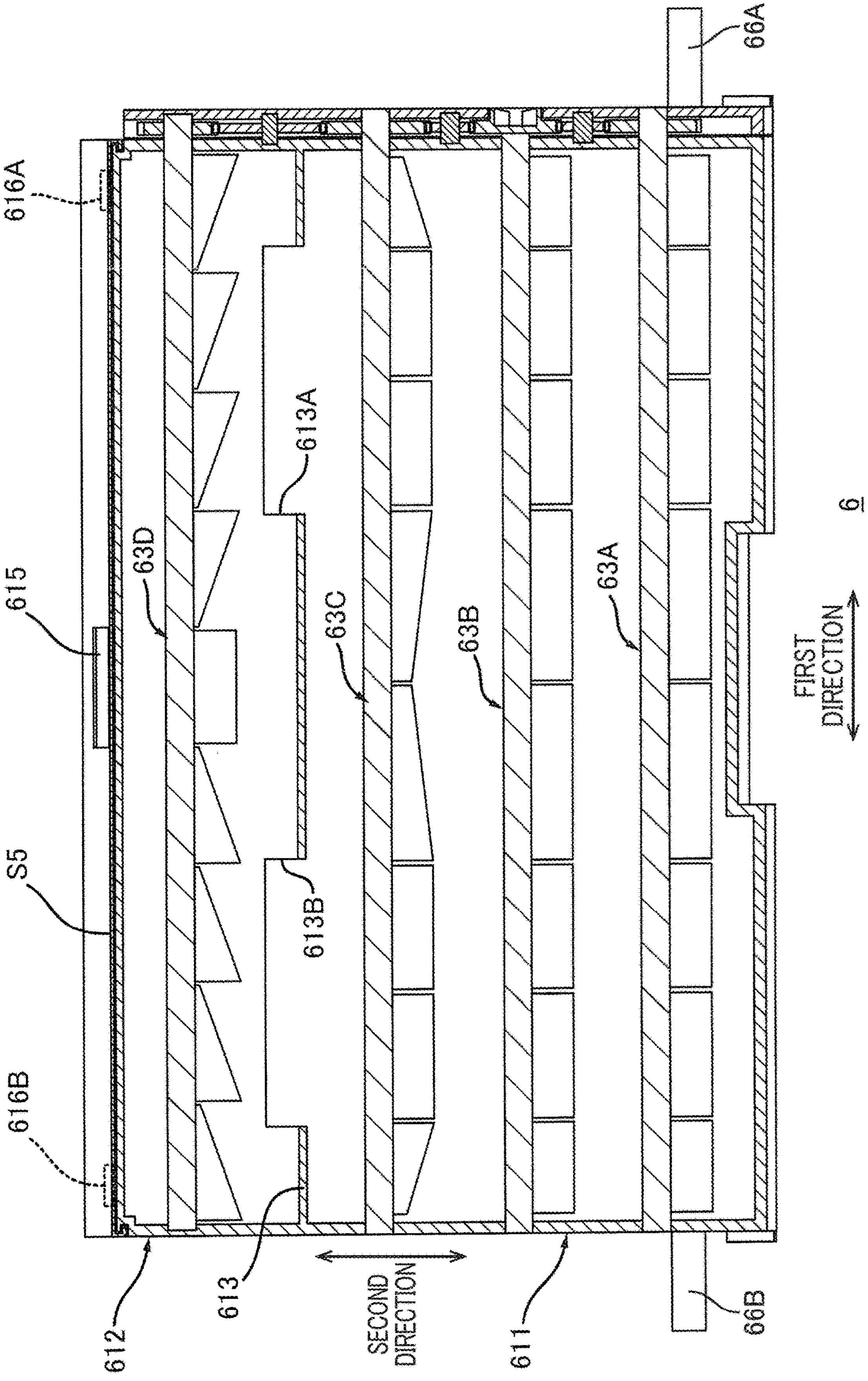
FIG. 13 is a cross-sectional view of the toner cartridge taken along a line XIII-XIII in FIG. 14.

As illustrated in FIG. 13, the second storage portion 612 is in communication with the first storage portion 611. The second storage portion 612 is configured to store the toner supplied from the first storage portion 611. The second storage portion 612 has a toner outlet opening 615 and two toner inlet openings 616A and 616B. In other words, the toner casing 61 has the toner outlet opening 615 and the two toner inlet openings 616A and 616B.

The toner outlet opening 615 is positioned in a center portion of the second storage portion 612 in the first direction. The toner outlet opening 615 is open on the outer surface S5 of the second storage portion 612. The toner outlet opening 615 is in communication with an internal space of the second storage portion 612. Hence, the toner in the second storage portion 612 cam be discharged through the toner outlet opening 615.

The toner inlet opening 616A is positioned in one end portion of the second storage portion 612 in the first direction. The toner inlet opening 616A is open on the outer surface S5 of the second storage portion 612. The toner inlet opening 616A is positioned apart from the toner outlet opening 615 in the first direction. The toner inlet opening 616A is in communication with the internal space of the second storage portion 612. The toner inlet opening 616A is configured to allow returning toner to pass therethrough in the state where the toner cartridge 6 is coupled to the drum cartridge 5. Here, the returning toner means the toner returning from the developing housing 531 to the toner cartridge 6.

The toner inlet opening 616B is positioned in another end portion of the second storage portion 612 in the first direction. The toner inlet opening 616B is open on the outer surface S5 of the second storage portion 612. The toner inlet opening 616B is positioned apart from the toner outlet opening 615 in the first direction. The toner inlet opening 616B is positioned opposite the toner inlet opening 616A with respect to the toner outlet opening 615 in the first direction. The toner inlet opening 616B is in communication with the internal space of the second storage portion 612. The toner inlet opening 616B is configured to allow the returning toner to pass therethrough in the state where the toner cartridge 6 is coupled to the drum cartridge 5 in the same manner as the toner inlet opening 616A.

3.1.3 Partition Wall 613

As illustrated in FIGS. 13 and 14, the partition wall 613 is positioned between the first storage portion 611 and the second storage portion 612. The partition wall 613 partitions an internal space of the toner casing 61 into the first storage portion 611 and the second storage portion 612. As illustrated in FIG. 13, the partition wall 613 has two openings 613A and 613B.

The opening 613A is positioned between the toner outlet opening 615 and the toner inlet opening 616A in the first direction. The internal space of the second storage portion 612 is in communication with the internal space of the first storage portion 611 through the opening 613A. The toner in the first storage portion 611 can flow into the second storage portion 612 through the opening 613A.

The opening 613B is positioned between the toner outlet opening 615 and the toner inlet opening 616B in the first direction. The opening 613B is positioned apart from the opening 613A in the first direction. The internal space of the second storage portion 612 is in communication with the internal space of the first storage portion 611 through the opening 613B. The toner in the first storage portion 611 can flow into the second storage portion 612 through the opening 613B.

3.1.4 Sheet Guide 614

As illustrated in FIG. 12, the sheet guide 614 is positioned at one end of the first storage portion 611 in the third direction (bottom end in FIG. 12).

As illustrated in FIG. 1, the sheet guide 614 is configured to guide the sheet S that is being conveyed toward the photosensitive drum 51 in the state where the drum cartridge 5 and the toner cartridge 6 are attached to the housing 2. That is, the image-forming apparatus 1 need not have a sheet guide separate from the toner cartridge 6 at the one end in the third direction of the toner cartridge 6, i.e., at one side of the toner cartridge 6 in the third direction.

Hence, according to the present embodiment, the toner cartridge 6 can be enlarged in size in the third direction to store more toner, comparison with a structure where a separate sheet guide is provided on the one side of the toner cartridge 6 in the third direction.

Further, the toner cartridge 6 is configured to be connected to the second housing 531B which is immovable relative to the photosensitive drum 51. Hence, the sheet guide 614 is also immovable relative to the photosensitive drum 51. Accordingly, the sheet guide 614 can stably guide the sheet S.

3.2 Toner Shutter 62

As illustrated in FIGS. 14 and 15, the toner shutter 62 is configured to open and close the toner outlet opening 615 and the toner inlet openings 616A and 616B. The toner shutter 62 is movable between a toner-shutter closing position (illustrated in FIG. 14) and a toner-shutter opening position (illustrated in FIG. 15). The toner shutter 62 closes the toner outlet opening 615 and the toner inlet openings 616A and 616B in a state where the toner shutter 62 is at the toner-shutter closing position, as illustrated in FIG. 14. The toner shutter 62 opens the toner outlet opening 615 and the toner inlet openings 616A and 616B in a state where the toner shutter 62 is at the toner-shutter opening position, as illustrated in FIG. 15.

As illustrated in FIG. 12, the toner shutter 62 extends in the first direction. The toner shutter 62 extends along the outer surface S5 of the second storage portion 612. The toner shutter 62 has an arcuate shaped cross-section. The toner shutter 62 has one end portion in the first direction that is supported by the one end portion of the second storage portion 612 in the first direction, and another end portion in the first direction that is supported by the other end portion of the second storage portion 612 in the first direction. Thus, the toner shutter 62 is supported by the second storage portion 612.

Figure 16:
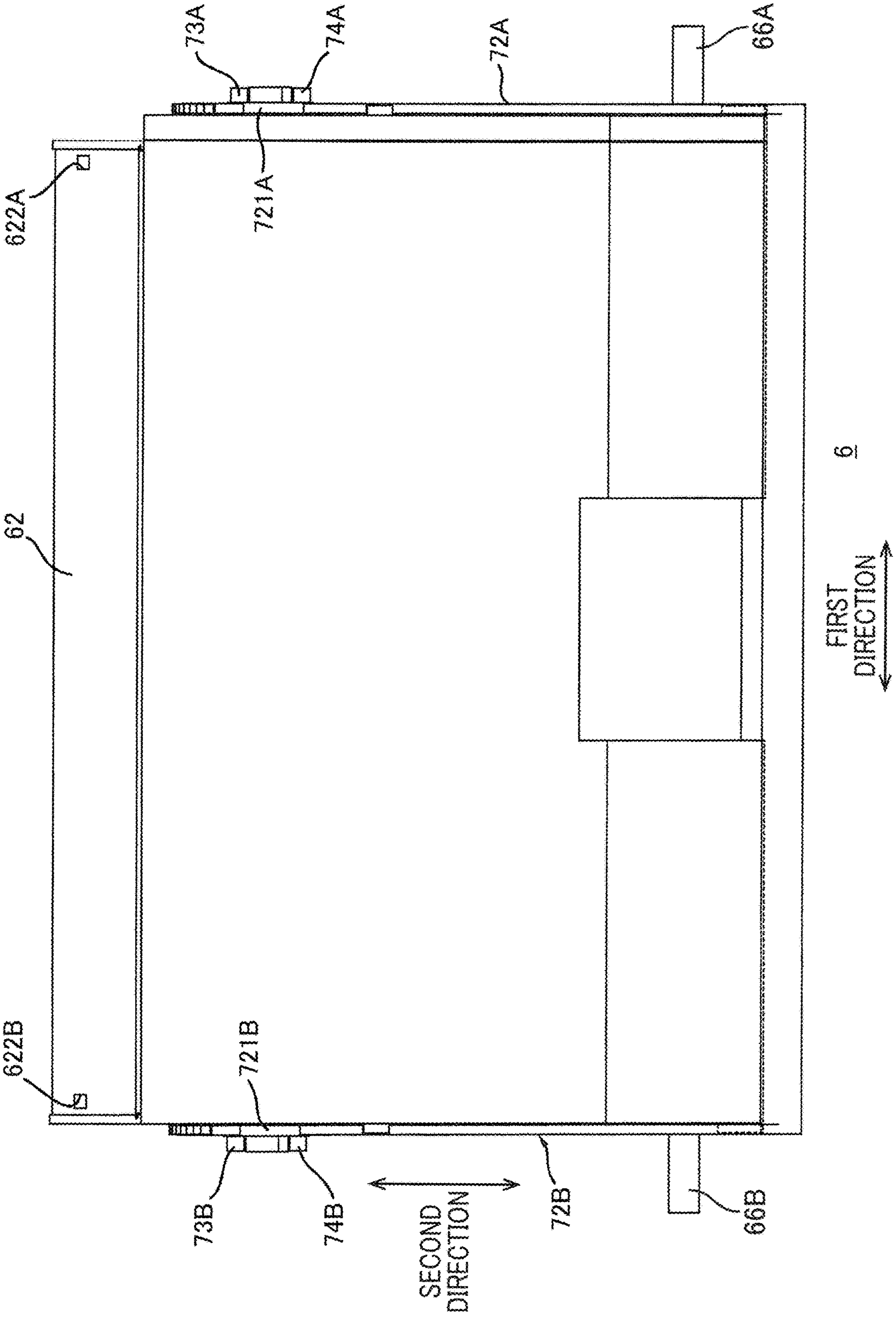
FIG. 16 is a plan view of the toner cartridge of FIG. 12 in the state where the toner shutter is at the toner-shutter opening position.

The toner shutter 62 has a shutter opening 621 and two engagement holes 622A and 622B (see FIG. 16).

3.2.1 Shutter Opening 621

The shutter opening 621 is positioned in a center portion of the toner shutter 62 in the first direction. As illustrated in FIG. 14, the shutter opening 621 is positioned away from the toner outlet opening 615 in a state where the toner shutter 62 is at the toner-shutter closing position. The shutter opening 621 does not communicate with the toner outlet opening 615 while the toner shutter 62 is at the toner-shutter closing position. Further, the toner shutter 62 closes the toner inlet openings 616A and 616B while the toner shutter 62 is at the toner-shutter closing position.

On the other hand, as illustrated in FIG. 15, the shutter opening 621 is in communication with the toner outlet opening 615 in a state where the toner shutter 62 is at the toner-shutter opening position. The toner shutter 62 is positioned away from both the toner inlet openings 616A and 616B while the toner shutter 62 is at the toner-shutter opening position. Hence, the toner inlet openings 616A and 616B are opened while the toner shutter 62 is at the toner-shutter opening position.

3.2.2 Engagement Holes 622A, 622B

As illustrated in FIG. 16, the engagement hole 622A is positioned at one end portion of the toner shutter 62 in the first direction. The engagement hole 622A is positioned apart from the shutter opening 621 (see FIG. 12) in the first direction. The engagement hole 622B is positioned at another end portion of the toner shutter 62 in the first direction. The engagement hole 622B is positioned apart from the shutter opening 621 in the first direction.

3.3 Agitators 63A, 63B, 63C, 63D

As illustrated in FIG. 13, the agitator 63A is positioned in the first storage portion 611. As illustrated in FIG. 14, the agitator 63A is positioned in another end portion of the first storage portion 611 in the second direction. The agitator 63A is configured to convey the toner in the first storage portion 611 toward the second storage portion 612.

The agitator 63B is positioned in the first storage portion 611. The agitator 63B is positioned between the agitator 63A and the second storage portion 612 in the second direction. The agitator 63B is configured to convey the toner in the first storage portion 611 toward the second storage portion 612.

The agitator 63C is positioned in the first storage portion 611. The agitator 63C is positioned between the agitator 63B and the second storage portion 612 in the second direction. The agitator 63C is configured to convey the toner in the first storage portion 611 toward the second storage portion 612.

The agitator 63D is positioned in the second storage portion 612. The agitator 63D is configured to convey the toner in the second storage portion 612 toward the toner outlet opening 615.

The agitators 63A, 63B and 63C are respectively rotatable in a clockwise direction as viewed from another side in the first direction (i.e., from the near side in FIG. 14), thereby conveying the toner in the first storage portion 611 toward the second storage portion 612.

The agitator 63D is rotatable in a counterclockwise direction as viewed from the other side in the first direction (i.e., from the near side in FIG. 14), to covey the toner (which has returned from the developing housing 531 through the toner inlet openings 616A and 616B into the second storage portion 612) in the first direction toward the toner outlet opening 615, as well as to convey a part of the returned toner back into the first storage portion 611. In this way, toner can be circulated between the first storage portion 611 and the second storage portion 612.

3.4 Supporting Portions 64A, 64B

As illustrated in FIG. 12, the supporting portion 64A is positioned at one end portion of the toner cartridge 6 in the first direction, more specifically, at one end of the toner casing 61 in the first direction. The supporting portion 64A is positioned opposite the supporting portion 64B with respect to the second storage portion 612 in the first direction. The supporting portion 64A protrudes out in the first direction from one end of the second storage portion 612 in the first direction, more specifically, from one outer end face of the second storage portion 612 in the first direction. The supporting portion 64A has a solid cylindrical shape. The supporting portion 64A supports the lever 70.

The supporting portion 64B is positioned at another end of the toner cartridge 6 in the first direction. Specifically, the supporting portion 64B is positioned at another end of the toner casing 61 in the first direction. The supporting portion 64B is positioned opposite the supporting portion 64A with respect to the second storage portion 612 in the first direction. The supporting portion 64B protrudes out in the first direction from another end of the second storage portion 612 in the first direction, more specifically, from another outer end face of the second storage portion 612 in the first direction. The supporting portion 64B has a solid cylindrical shape. The supporting portion 64B supports the lever 70 in cooperation with the supporting portion 64A.

3.5 Ribs 65A, 65B

Figure 17:
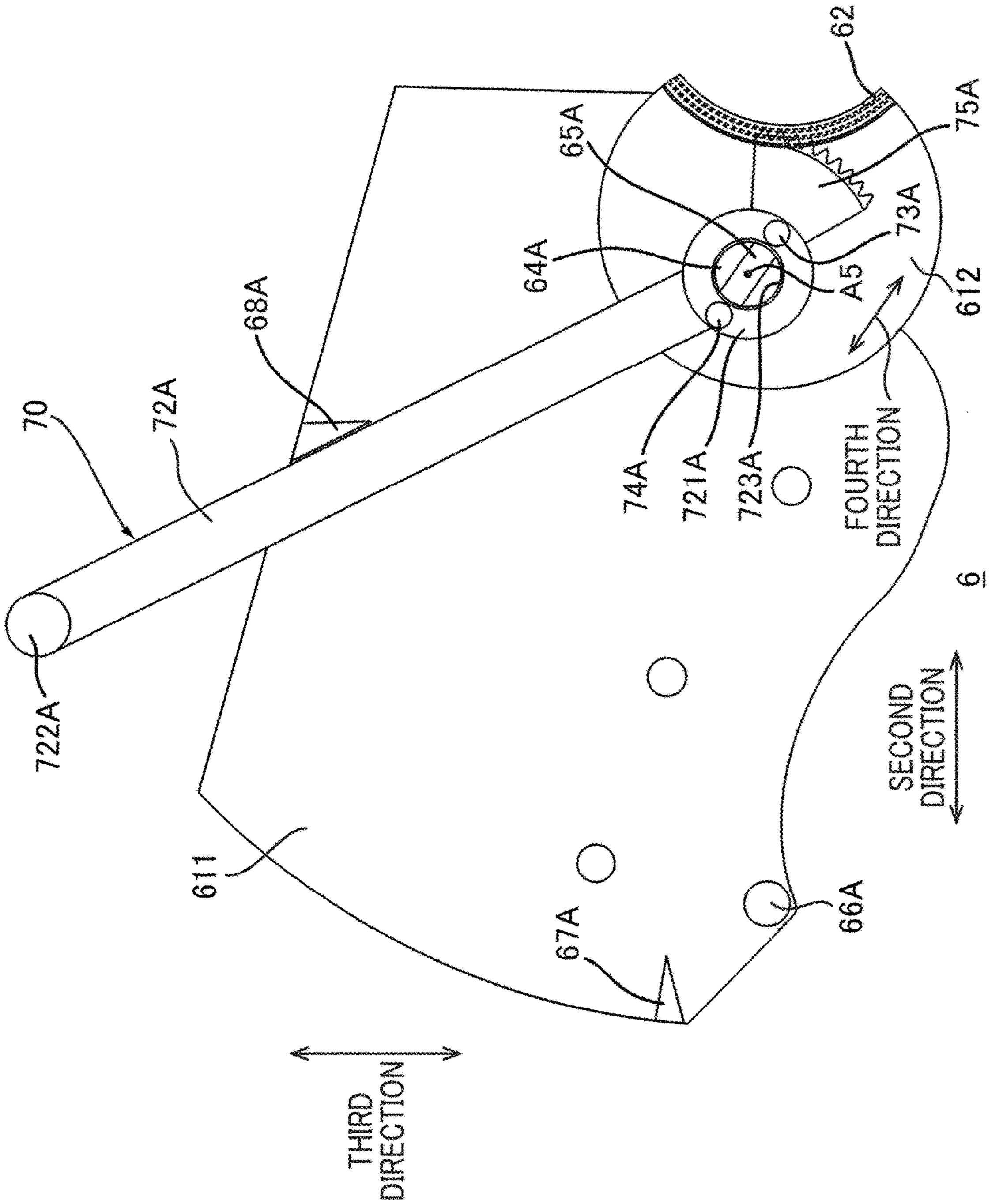
FIG. 17 is a side view of the toner cartridge of FIG. 12 as viewed from the one side in the first direction.

The rib 65A is positioned at the one end of the toner cartridge 6 in the first direction, more specifically, at the one end of the toner casing 61 in the first direction. The rib 65A is positioned opposite the rib 65B with respect to the second storage portion 612 in the first direction. The rib 65A protrudes out in the first direction from the supporting portion 64A. As illustrated in FIG. 17, the rib 65A extends in a fourth direction. The fourth direction crosses all the first, second, and third directions. Preferably, the fourth direction be perpendicular to the first direction, and cross both the second and third directions.

Figure 18:
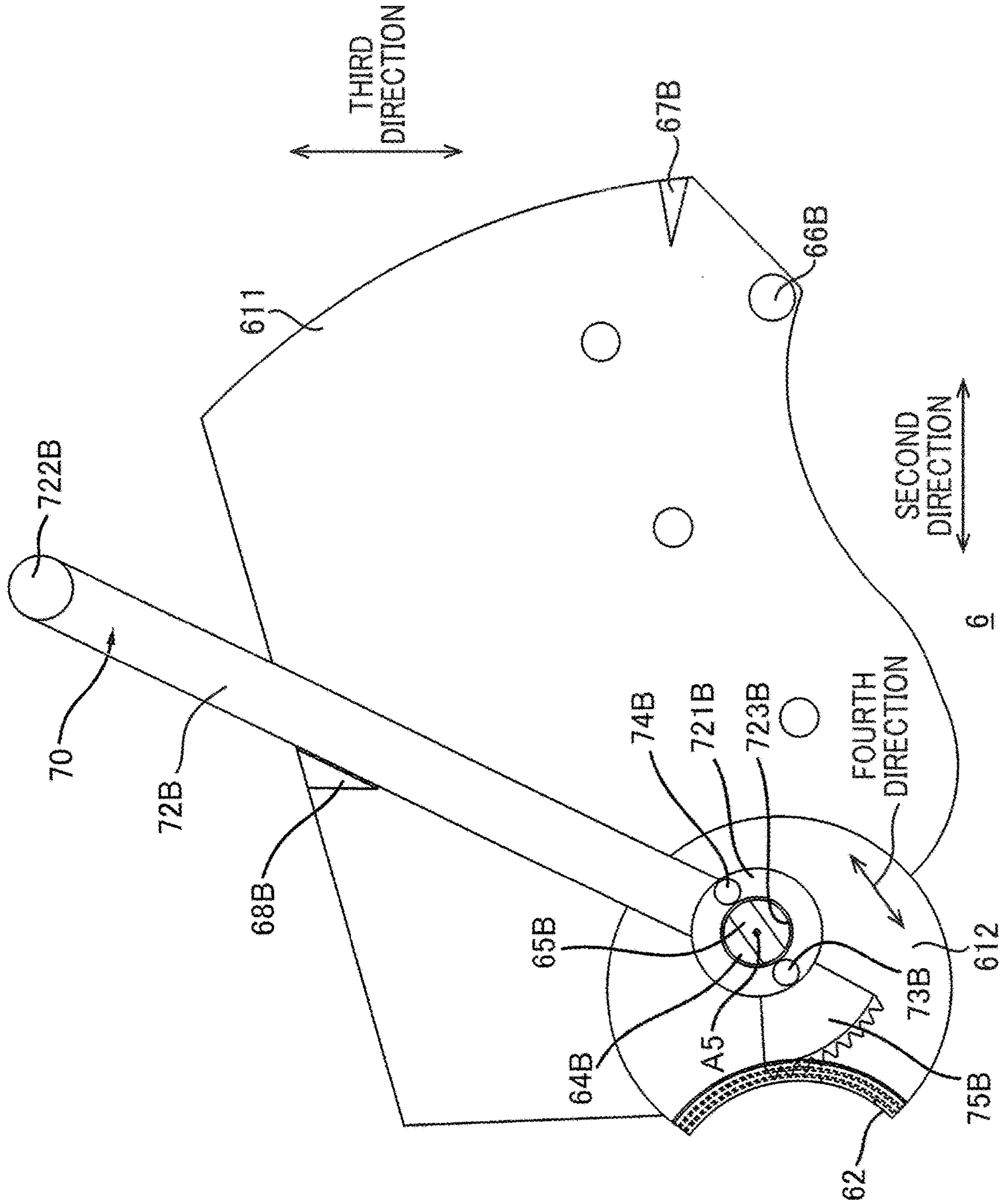
FIG. 18 is a side view of the toner cartridge of FIG. 12 as viewed from the other side in the first direction.

As illustrated in FIG. 12, the rib 65B is positioned at the other end of the toner cartridge 6 in the first direction, more specifically, at the other end of the toner casing 61 in the first direction. The rib 65B is positioned opposite the rib 65A with respect to the second storage portion 612 in the first direction. The rib 65B protrudes out in the first direction from the supporting portion 64B. As illustrated in FIG. 18, the rib 65B extends in the fourth direction. That is, the rib 65B extends in the same direction as the rib 65A does.

3.6 Protrusions 66A, 66B

As illustrated in FIG. 12, the protrusion 66A is positioned at the one end of the toner cartridge 6 in the first direction, more specifically, at the one end of the toner casing 61 in the first direction. The protrusion 66A is positioned at another end portion of the toner cartridge 6 in the second direction, more specifically, at another end portion of the toner casing 61 in the second direction. The protrusion 66A is positioned opposite the protrusion 66B with respect to the first storage portion 611 in the first direction. The protrusion 66A protrudes out in the first direction from one end (one end surface) of the first storage portion 611 in the first direction. The protrusion 66A has a columnar shape.

The protrusion 66B is positioned on the other end of the toner cartridge 6 in the first direction, more specifically, at the other end of the toner casing 61 in the first direction. The protrusion 66B is positioned on the other end portion of the toner cartridge 6 in the second direction, more specifically, at the other end portion of the toner casing 61 in the second direction. The protrusion 66B is positioned opposite the protrusion 66A with respect to the first storage portion 611 in the first direction. The protrusion 66B extends in the first direction. The protrusion 66B has a columnar shape.

3.7 First Stoppers 67A, 67B

The first stopper 67A is positioned on the one end of the toner cartridge 6 (toner casing 61) in the first direction. The first stopper 67A is positioned on the other end portion of the toner cartridge 6 (toner casing 61) in the second direction. The first stopper 67A is positioned opposite the first stopper 67B with respect to the first storage portion 611 in the first direction. The first stopper 67A protrudes out from one outer end face of the first storage portion 611 in the first direction.

The first stopper 67B is positioned at the other end of the toner cartridge 6 (toner casing 61) in the first direction. The first stopper 67B is positioned at the other end portion of the toner cartridge 6 (toner casing 61) in the second direction. The first stopper 67B is positioned opposite the first stopper 67A with respect to the first storage portion 611 in the first direction. The first stopper 67B protrudes out from another outer end face of the first storage portion 611 in the first direction.

3.8 Second Stoppers 68A, 68B

The second stopper 68A is positioned at the one end of the toner cartridge 6 (toner casing 61) in the first direction. The second stopper 68A is positioned between the supporting portion 64A and the first stopper 67A in the second direction. The second stopper 68A is positioned opposite the second stopper 68B with respect to the first storage portion 611 in the first direction. The second stopper 68A protrudes out from the one outer end face of the first storage portion 611 in the first direction.

The second stopper 68B is positioned at the other end of the toner cartridge 6 (toner casing 61) in the first direction. The second stopper 68B is positioned between the supporting portion 64B and the first stopper 67B in the second direction. The second stopper 68B is positioned opposite the second stopper 68A with respect to the first storage portion 611 in the first direction. The second stopper 68B protrudes out from the other outer end face of the first storage portion 611 in the first direction.

3.9 Lever 70

The lever 70 is configured to be gripped by a user when the user replaces the toner cartridge 6. The lever 70 is movable between a first position (illustrated in FIG. 19) and a second position (illustrated in FIG. 18). The lever 70 is pivotally movable about an axis A5 between the first position and the second position. The lever 70 is independent of the toner shutter 62. Hence, the toner shutter 62 is immovable regardless of the pivotal movement of the lever 70 between the first position and the second position in a state where the toner cartridge 6 is detached from the drum cartridge 5.

The lever 70 includes a grip 71, two arms 72A and 72B, two protrusions 73A and 73B (see FIG. 16), two protrusions 74A and 74B (see FIG. 16), and two gears 75A and 75B.

3.9.1 Grip 71

The grip 71 is a part configured to be gripped by the user. The grip 71 extends in the first direction. The grip 71 is positioned above the toner casing 61 in the third direction while the lever 70 is at the second position. The grip 71 has a solid columnar shape.

3.9.2. Arms 72A, 72B

The arm 72A is positioned at the one end of the toner cartridge 6 (toner casing 61) in the first direction. The arm 72A connects one end of the grip 71 in the first direction to the supporting portion 64A. Specifically, as illustrated in FIG. 17, the arm 72A has one end provided with a first end portion 721A, and another end provided with a second end portion 722A. The first end portion 721A has a through-hole 723A. The supporting portion 64A is fitted with the through-hole 723A. Hence, the arm 72A is supported by the supporting portion 64A. The second end portion 722A of the arm 72A is connected to the one end of the grip 71 in the first direction. The arm 72A is pivotally movable about the supporting portion 64A.

The arm 72A is configured to abut on the first stopper 67A when the lever 70 is brought to the first position. The arm 72A is configured to abut on the second stopper 68A when the lever 70 is brought to the second position, as illustrated in FIG. 17.

As illustrated in FIG. 12, the arm 72B is positioned at the other end of the toner cartridge 6 (toner casing 61) in the first direction. The arm 72A connects another end of the grip 71 in the first direction to the supporting portion 64B. Specifically, as illustrated in FIG. 18, the arm 72B has one end provided with a first end portion 721B, and another end provided with a second end portion 722B. The first end portion 721B has a through-hole 723B. The supporting portion 64A is fitted with the through-hole 723B. Hence, the arm 72B is supported by the supporting portion 64B. The second end portion 722B of the arm 72B is connected to the other end of the grip 71 in the first direction. The arm 72B is pivotally movable about the supporting portion 64B.

Figure 19:
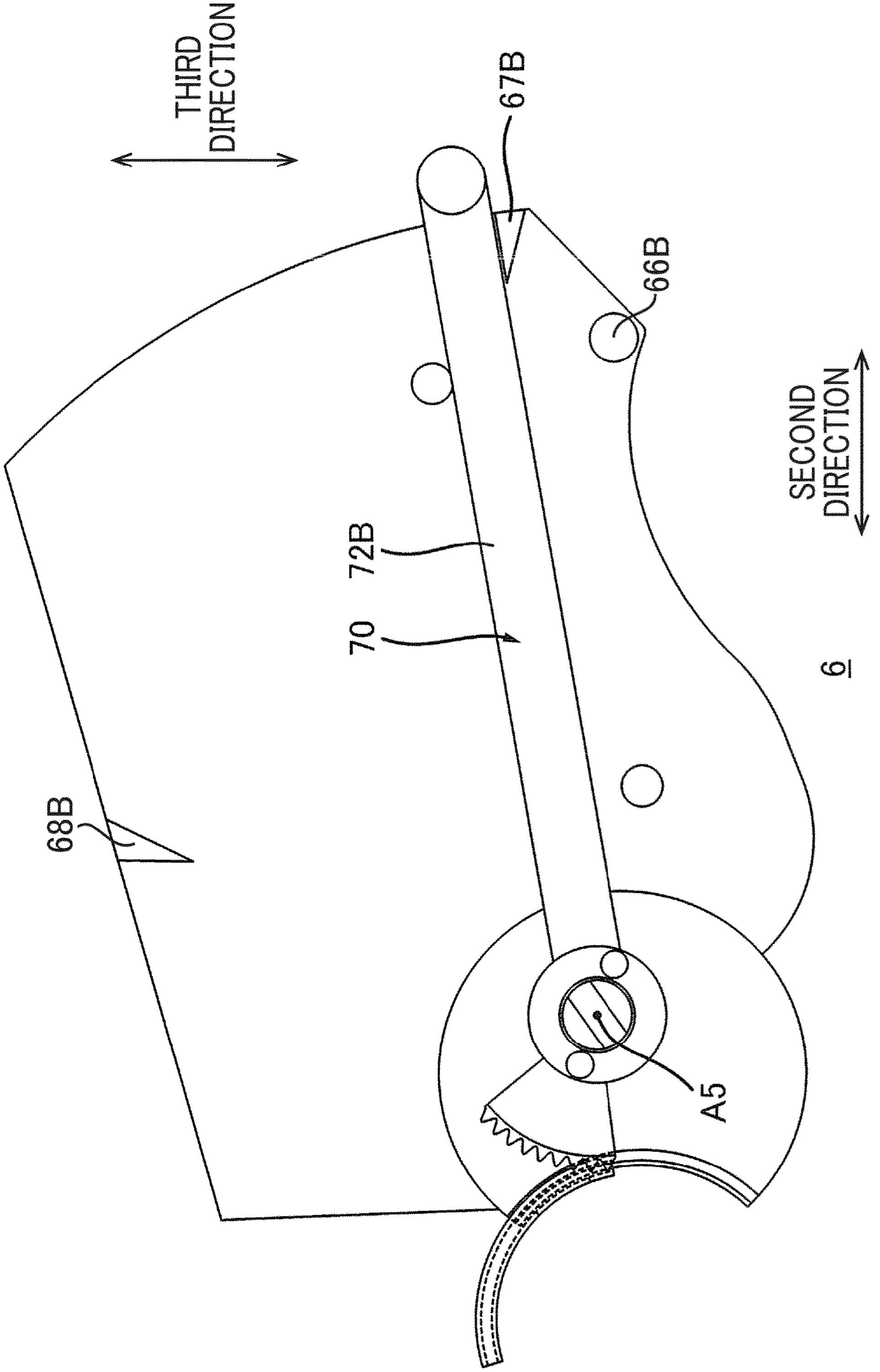
FIG. 19 is another side view of the toner cartridge of FIG. 12 as viewed from the other side in the first direction in a state where the toner shutter is at the toner-shutter opening position.

The arm 72B is configured to abut on the first stopper 67B when the lever 70 is brought to the first position, as illustrated in FIG. 19. The arm 72B is configured to abut on the second stopper 68B when the lever 70 is brought to the second position, as illustrated in FIG. 18.

3.9.3 Protrusions 73A, 73B

As illustrated in FIG. 16, the protrusion 73A is positioned opposite the arm 72B with respect to the arm 72A in the first direction. The protrusion 73A protrudes out in the first direction from the first end portion 721A of the arm 72A. The protrusion 73A has a columnar shape. As illustrated in FIG. 17, the protrusion 73A is positioned in alignment with the rib 65A in the fourth direction when the lever 70 is at the second position. The protrusion 73A is positioned between the rib 65A and the toner shutter 62 when the lever 70 is at the second position.

As illustrated in FIG. 16, the protrusion 73B is positioned opposite the arm 72A with respect to the arm 72B in the first direction. The protrusion 73B protrudes out from the first end portion 721B of the arm 72B. The protrusion 73B has a columnar shape. As illustrated in FIG. 18, the protrusion 73B is positioned in alignment with the rib 65B in the fourth direction when the lever 70 is at the second position. The protrusion 73B is positioned between the rib 65B and the toner shutter 62 when the lever 70 is at the second position.

3.9.4 Protrusions 74A, 74B

As illustrated in FIG. 16, the protrusion 74A is positioned opposite the arm 72B with respect to the arm 72A in the first direction. The protrusion 74A protrudes out from the first end portion 721A of the arm 72A. The protrusion 74A has a columnar shape. As illustrated in FIG. 17, the protrusion 74A is positioned in alignment with the rib 65A and the protrusion 73A in the fourth direction when the lever 70 is at the second position. The protrusion 74A is positioned opposite the protrusion 73A with respect to the rib 65A when the lever 70 is at the second position.

As illustrated in FIG. 16, the protrusion 74B is positioned opposite the arm 72A with respect to the arm 72B in the first direction. The protrusion 74B protrudes out from the first end portion 721B of the arm 72B. The protrusion 74B has a columnar shape. As illustrated in FIG. 18, the protrusion 74B is positioned in alignment with the rib 65B and the protrusion 73B in the fourth direction when the lever 70 is at the second position. The protrusion 74B is positioned opposite the protrusion 73B with respect to the rib 65B when the lever 70 is at the second position.

3.9.5 Gears 75A, 75B

As illustrated in FIG. 12, the gear 75A is positioned at the one end of the toner cartridge 6 (toner casing 61) in the first direction. As illustrated in FIG. 17, the gear 75A extends from the first end portion 721A of the arm 72A. The gear 75A is positioned opposite the protrusion 74A with respect to the protrusion 73A in the fourth direction. The gear 75A has a plurality of gear teeth arrayed with one another in a pivoting direction of the lever 70.

The gear 75A is configured to mesh with the engagement part 536B (see FIG. 8) of the developing shutter 536 of the drum cartridge 5 in the state where the toner cartridge 6 is coupled to the drum cartridge 5. That is, the lever 70 is engaged with the developing shutter 536 in the state where the drum cartridge 5 and the toner cartridge 6 are coupled to each other.

As illustrated in FIG. 12, the gear 75B is positioned at the other end of the toner cartridge 6 (toner casing 61) in the first direction. As illustrated in FIG. 18, the gear 75B protrudes out from the first end portion 721B of the arm 72B. The gear 75B is positioned opposite the protrusion 74B with respect to the protrusion 73B in the fourth direction. The gear 75B has a plurality of gear teeth aligned with one another in the pivoting direction of the lever 70.

The gear 75B is configured to mesh with the engagement part 536C (see FIG. 8) of the developing shutter 536 of the drum cartridge 5 in the state where the toner cartridge 6 is coupled to the drum cartridge 5.

3.10 Coupling of Toner Cartridge 6 to Drum Cartridge 5

Figure 20:
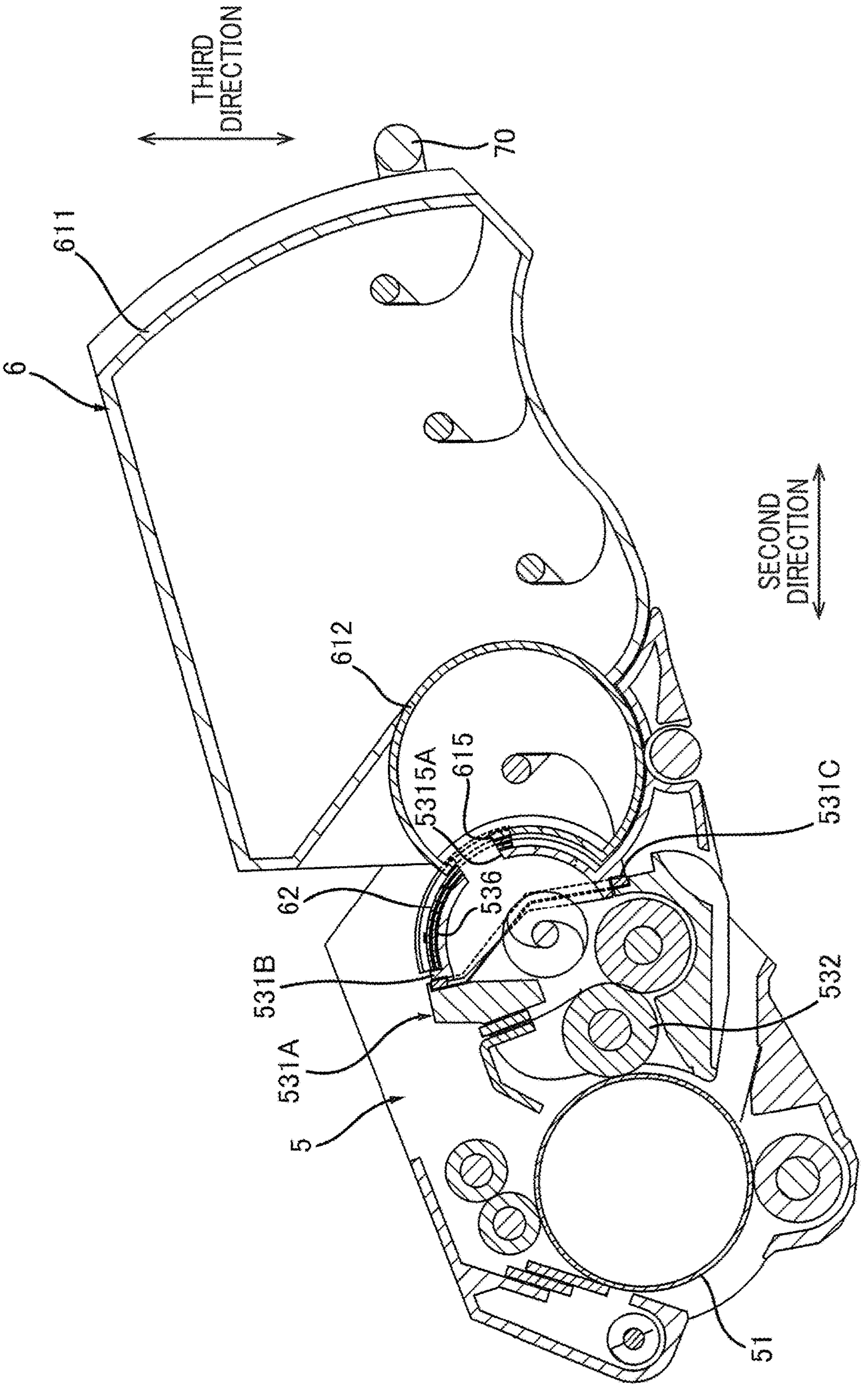
FIG. 20 is a cross-sectional view of the drum cartridge and the toner cartridge coupled to each other in a state where the toner shutter of the toner cartridge is at the toner-shutter opening position and the developing shutter of the drum cartridge is at the developing-shutter opening position.
Figure 21:
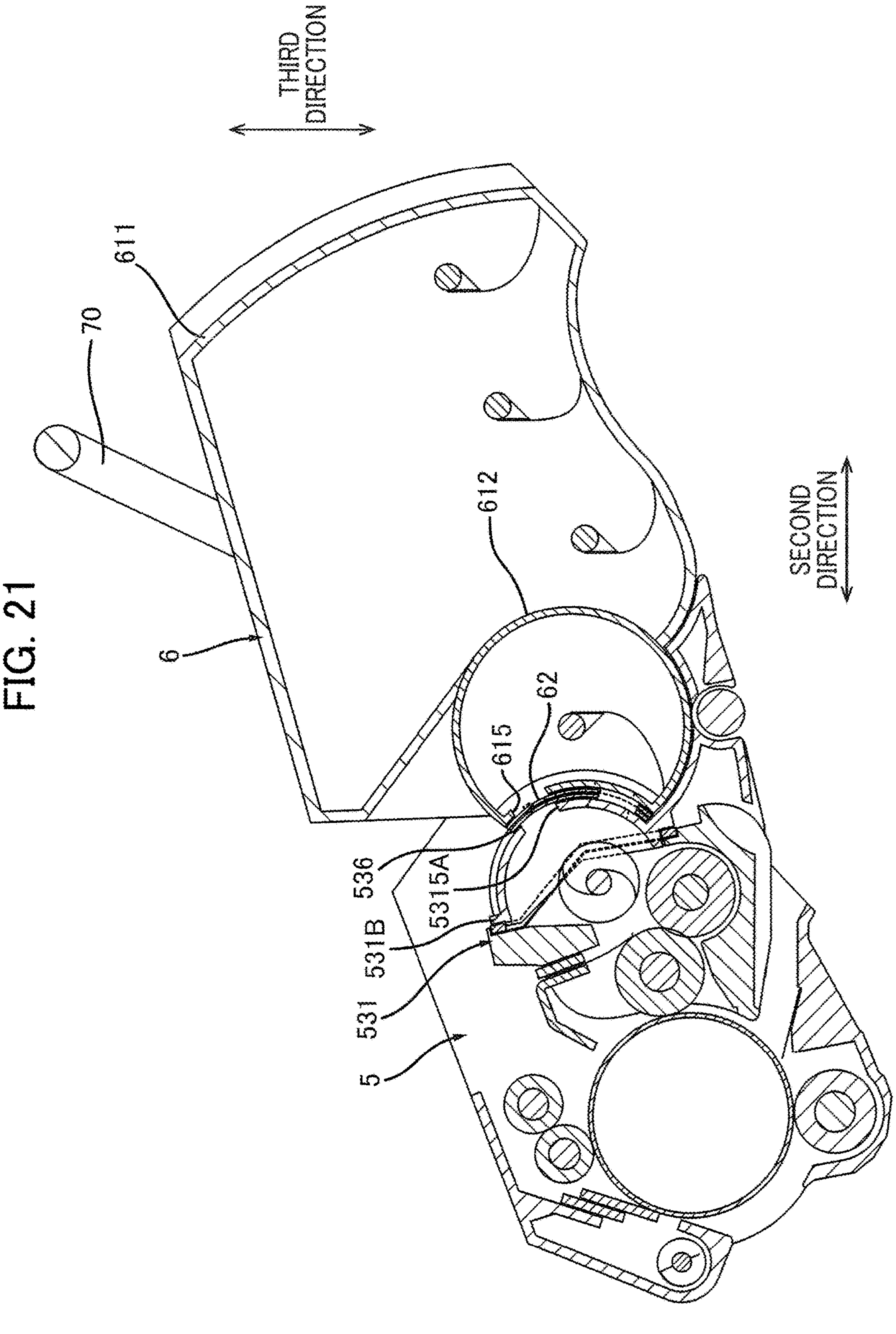
FIG. 21 is a cross-sectional view of the drum cartridge and the toner cartridge coupled to each other in a state where the toner shutter is at the toner-shutter closing position and the developing shutter is at the developing-shutter closing position.

As illustrated in FIGS. 20 and 21, the lever 70 is pivotally movable between the first position (see FIG. 20) and the second position (see FIG. 21) in the state where the toner cartridge 6 is coupled to the drum cartridge 5. Specifically, the lever 70 is movable between the first position where the lever 70 renders the developing shutter 536 at the developing-shutter opening position and the second position where the lever 70 renders the developing shutter 536 at the developing-shutter closing position.

The second storage portion 612 of the toner cartridge 6 is coupled to the second housing 531B of the drum cartridge 5 in the state where the toner cartridge 6 is coupled to the drum cartridge 5. In the state where the toner cartridge 6 is coupled to the drum cartridge 5, the rib 65A (see FIG. 17) of the toner cartridge 6 is engaged with the guide part 554A (see FIG. 3) of the drum cartridge 5, and the rib 65B (see FIG. 18) of the toner cartridge 6 is engaged with the guide part 554B (see FIG. 6) of the drum cartridge 5.

The engagement parts 536D and 536E (see FIG. 8) of the drum cartridge 5 are engaged with the engagement holes 622A and 622B (see FIG. 16) of the toner cartridge 6, respectively, in the state where the toner cartridge 6 is coupled to the drum cartridge 5. Hence, the toner shutter 62 and the developing shutter 536 are movable together in the state where the toner cartridge 6 is coupled to the drum cartridge 5.

The gears 75A and 75B (see FIG. 12) of the lever 70 are meshingly engaged with the engagement parts 536B and 536C (see FIG. 8) of the developing shutter 536, respectively, in the state where the toner cartridge 6 is coupled to the drum cartridge 5. Hence, the developing shutter 536 is movable in conjunction with the movement of the lever 70 in the state where the toner cartridge 6 is coupled to the drum cartridge 5.

As the lever 70 pivots from the first position (FIG. 20) to the second position (FIG. 21) in the state where the toner cartridge 6 is coupled to the drum cartridge 5, the developing shutter 536 is moved from the developing-shutter opening position (FIG. 11) to the developing-shutter closing position (FIG. 10) in conjunction with the movement of the lever 70.

At this time, the toner shutter 62 is moved relative to the second storage portion 612 from the toner-shutter opening position (see FIG. 15) to the toner-shutter closing position (see FIG. 14). Specifically, the toner shutter 62 is moved from the toner-shutter opening position to the toner-shutter closing position in conjunction with the movement of the developing shutter 536 from the developing-shutter opening position to the developing-shutter closing position.

That is, the toner in the toner cartridge 6 is restrained from being supplied to the developing housing 531 while the lever 70 is at the second position in the state where the toner cartridge 6 is attached to the drum cartridge 5 (see FIG. 21).

The protrusions 73A and 74A (see FIG. 17) of the toner cartridge 6 are engaged with the guide part 554A (see FIG. 5) of the drum cartridge 5 while the lever 70 is at the second position in the state where the toner cartridge 6 is coupled to the drum cartridge 5. Likewise, the protrusions 73B and 74B (see FIG. 18) of the toner cartridge 6 are engaged with the guide part 554B (see FIG. 6) of the drum cartridge 5 while the lever 70 is at the second position in the state where the toner cartridge 6 is coupled to the drum cartridge 5. Hence, the toner cartridge 6 can be detached from the drum cartridge 5 while the lever 70 is at the second position in the state where the toner cartridge 6 is coupled to the drum cartridge 5. That is, in a state where both the toner cartridge 6 and the drum cartridge 5 are attached to the housing 2, the coupling between the toner cartridge 6 and the drum cartridge 5 can be released while the lever 70 is at the second position.

Further, as the lever 70 pivots from the second position (see FIG. 21) to the first position (see FIG. 20) in the state where the toner cartridge 6 is coupled to the drum cartridge 5, the developing shutter 536 is moved from the developing-shutter closing position (see FIG. 10) to the developing-shutter opening position (see FIG. 11) in conjunction with the movement of the lever 70.

At this time, the toner shutter 62 is pivotally moved together with the developing shutter 536, and hence, the toner shutter 62 is moved, relative to the second storage portion 612, from the toner-shutter closing position (see FIG. 14) to the toner-shutter opening position (see FIG. 15).

As illustrated in FIG. 20, in the state where the toner cartridge 6 is coupled to the drum cartridge 5 and the lever 70 is at the first position, the developing shutter 536 is at the developing-shutter opening position; the toner shutter 62 is at the toner-shutter opening position; the toner outlet opening 615 (see FIG. 13) of the toner cartridge 6 is in communication with the inlet port 5315A (see FIG. 8) of the second housing 531B; the toner inlet opening 616A (see FIG. 12) of the toner cartridge 6 is in communication with the outlet port 5315B (see FIG. 8) of the second housing 531B; and the toner inlet opening 616B (see FIG. 12) of the toner cartridge 6 is in communication with the outlet port 5315C (see FIG. 8) of the second housing 531B.

Hence, in the state where the toner cartridge 6 is coupled to the drum cartridge 5 and the lever 70 is at the first position, the toner in the second storage portion 612 of the toner cartridge 6 can flow into the second housing 531B through the inlet port 5315A, while the toner in the second housing 531B can flow back into the second storage portion 612 through the toner inlet openings 616A and 616B (see FIG. 12). As such, the toner inlet openings 616A and 616B can allow the returning toner to flow therethrough in the state where the toner cartridge 6 is coupled to the drum cartridge 5 and the lever 70 is at the first position.

In the state where the toner cartridge 6 is coupled to the drum cartridge 5 and the lever 70 is at the first position, the protrusions 73A and 74A (see FIG. 17) of the toner cartridge 6 are engaged with the locking parts 555A and 556A (see FIG. 3) of the drum cartridge 5, respectively, whereas the protrusions 73B and 74B (see FIG. 18) of the toner cartridge 6 are engaged with the locking parts 555B and 556B (see FIG. 6), respectively. Hence in the state where the toner cartridge 6 is coupled to the drum cartridge 5 and the lever 70 is at the first position, the toner cartridge 6 cannot be decoupled from the drum cartridge 5. That is, in the state where the drum cartridge 5 and the toner cartridge 6 are attached to the housing 2 and the lever 70 is at the first position, the coupling between the toner cartridge 6 and the drum cartridge 5 cannot be released.

As illustrated in FIG. 2, in the state where the toner cartridge 6 is coupled to the drum cartridge 5 and the lever 70 is at the first position, the drum cartridge 5 and the toner cartridge 6 are collectively detachable from the housing 2. That is, in the state where the drum cartridge 5 and the toner cartridge 6 are attached to the housing 2 and the lever 70 is at the first position, both the drum cartridge 5 and the toner cartridge 6 are detachable together, as a unit, from the housing 2.

Figure 22:
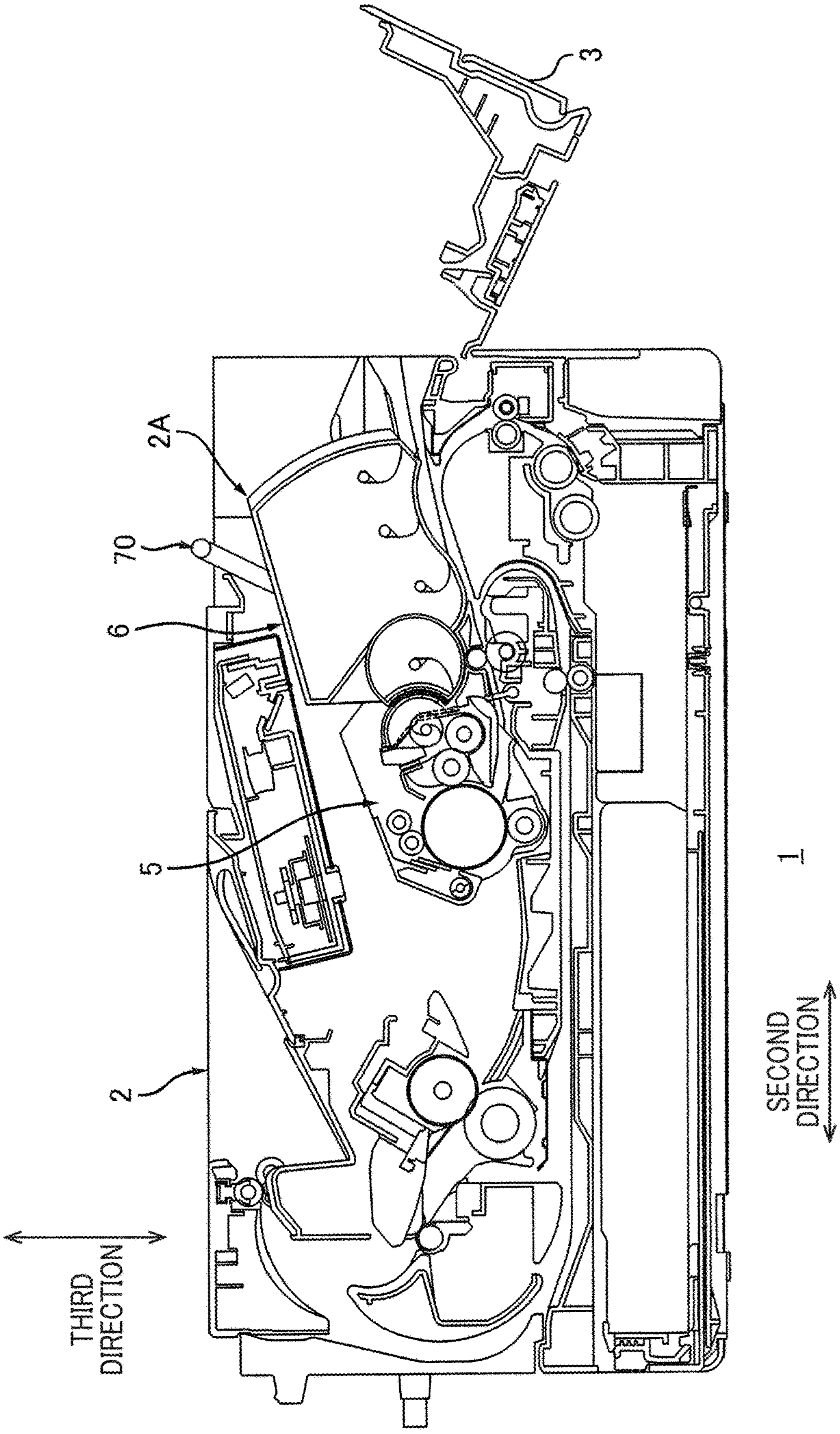
FIG. 22 is a schematic cross-sectional view of the image-forming apparatus of FIG. 1 in a state where a cover thereof is at its open position and a lever of the toner cartridge is at its second position.
Figure 23:
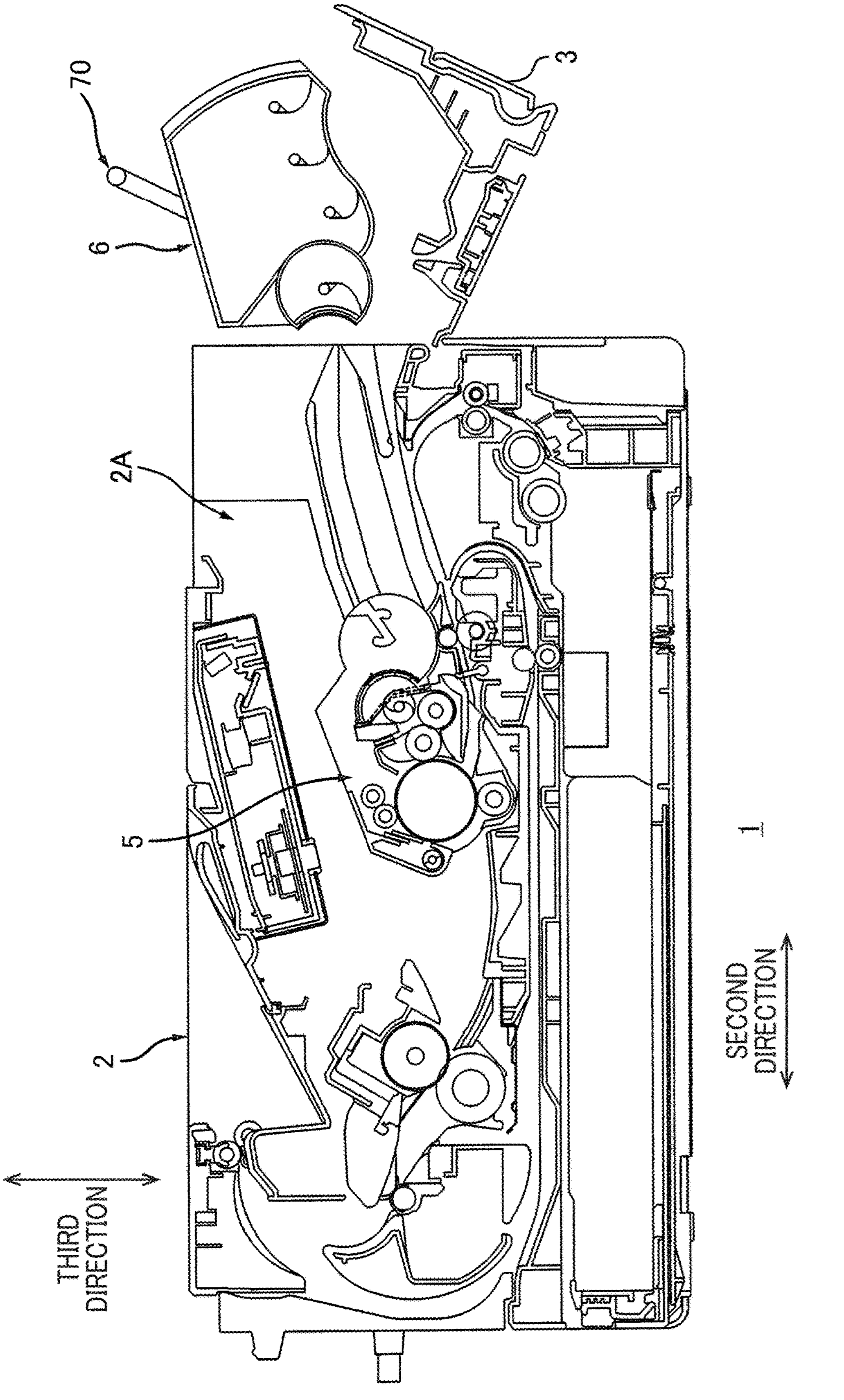
FIG. 23 is a schematic cross-sectional view of the image-forming apparatus of FIG. 1 in a state where the toner cartridge alone is detached from the housing.

On the other hand, as illustrated in FIGS. 22 and 23, in the state where the toner cartridge 6 is coupled to the drum cartridge 5 and the lever 70 is at the second position, the toner cartridge 6 alone can be detached from the housing 2 independently of the drum cartridge 5. That is, in the state where the drum cartridge 5 and the toner cartridge 6 are attached to the housing 2 and the lever 70 is at the second position, the toner cartridge 6 alone is detachable from the housing 2, independently of the drum cartridge 5 (with the drum cartridge 5 kept attached to the housing 2).

4. Details of Housing 2

Next, the housing 2 will be described in detail with reference to FIGS. 1, 2, 22 and 24.

Figure 24:
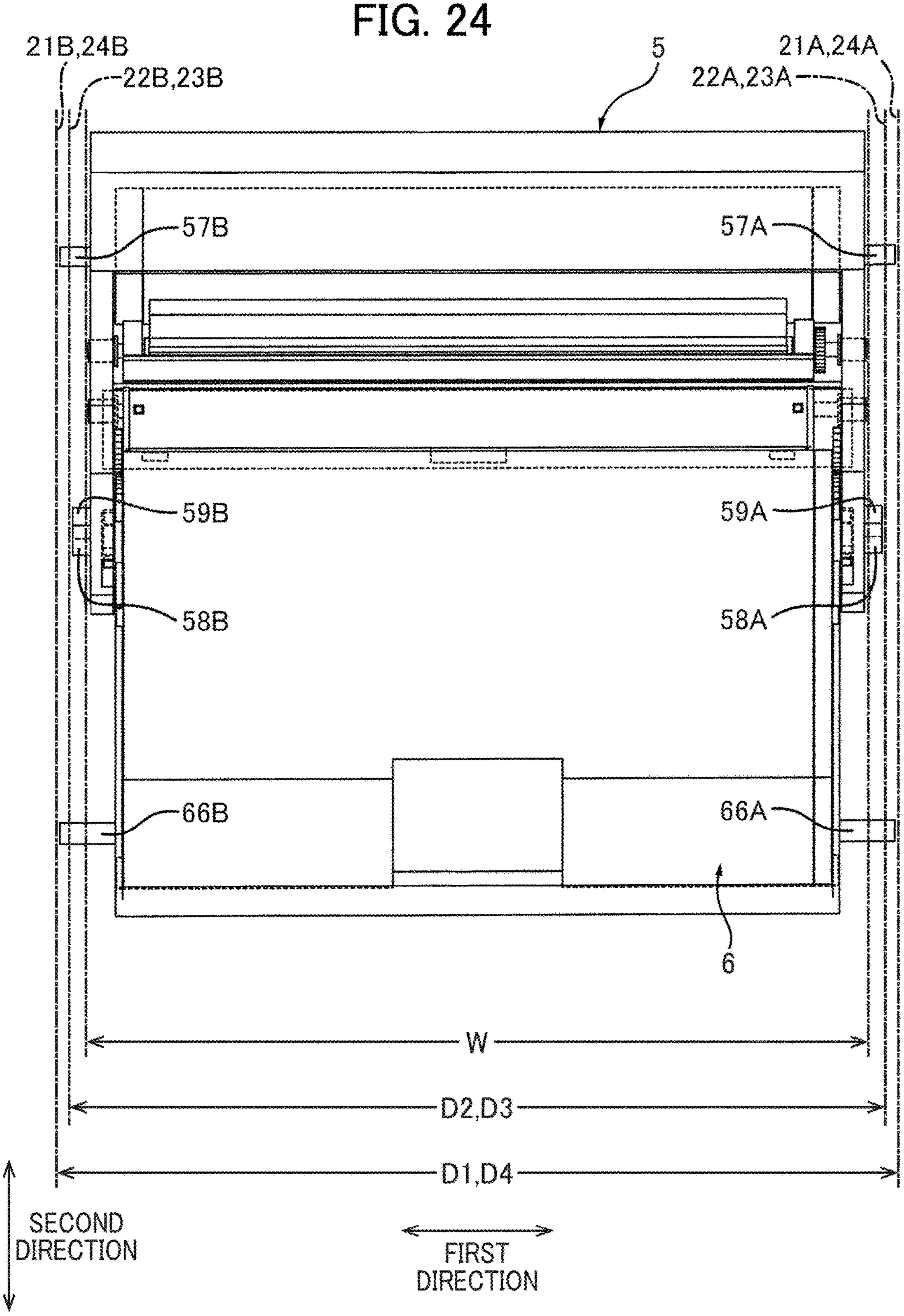
FIG. 24 is a plan view of the drum cartridge and the toner cartridge coupled to each other.

As illustrated in FIGS. 2 and 24, the housing 2 has a pair of first drum cartridge guides 21A and 21B, a pair of second drum cartridge guides 22A and 22B, a pair of third drum cartridge guides 23A and 23B, and a pair of toner cartridge guides 24A and 24B. Further, as illustrated in FIG. 2, the housing 2 also has a pair of first stoppers 25A, and a pair of second stoppers 26A.

4.1 Drum Cartridge Guides 21A, 22A, 23A, 21B, 22B, 23B

The first through third drum cartridge guides 21A, 22A and 23A are positioned in one side wall of the housing 2 at the one side in the first direction.

The first through third drum cartridge guides 21A, 22A and 23A are configured to guide the drum cartridge 5 within the housing 2.

Specifically, the first drum cartridge guide 21A is configured to guide the protrusion 57A (see FIG. 4) of the drum cartridge 5. The first drum cartridge guide 21A extends in the second direction. The first drum cartridge guide 21A has a first end E41 and a second end E42 in the second direction. The first end E41 is positioned between the conveyer roller 8 and the fixing device 9 in the second direction. The second end E42 is open to the opening 2A. In the present embodiment, the first drum cartridge guide 21A is in a form of a groove.

The second drum cartridge guide 22A is configured to guide the protrusion 58A (see FIG. 4) of the drum cartridge 5. The second drum cartridge guide 22A is positioned below the first drum cartridge guide 21A, i.e., on the one side of the first drum cartridge guide 21A in the third direction. The second drum cartridge guide 22A extends in the second direction. The second drum cartridge guide 22A has a first end E51 and a second end E52 in the second direction. The first end E51 is positioned above the conveyer roller 8, i.e., on the other side of the conveyer roller 8 in the third direction. The second end E52 is open to the opening 2A. In the present embodiment, the second drum cartridge guide 22A is in a form of a groove.

The third drum cartridge guide 23A is configured to guide the protrusion 59A (see FIG. 4) of the drum cartridge 5. The third drum cartridge guide 23A is positioned below the second drum cartridge guide 22A, i.e., on the one side of the second drum cartridge guide 22A in the third direction. The third drum cartridge guide 23A extends in the second direction. The third drum cartridge guide 23A has a first end E61 and a second end E62 in the second direction. The first end E61 is positioned between the first end E51 of the second drum cartridge guide 22A and the conveyer roller 8 in the third direction. The second end E62 is open to the opening 2A. In the present embodiment, the third drum cartridge guide 23A is in a form of a groove.

As illustrated in FIG. 24, The first through third drum cartridge guides 21B, 22B and 23B are positioned in another side wall of the housing 2 at the other side in the first direction. The first through third drum cartridge guides 21B, 22B and 23B are configured to guide the drum cartridge 5 within the housing 2.

Specifically, the first drum cartridge guide 21B has the same shape as the first drum cartridge guide 21A, and is configured to guide the protrusion 57B (see FIG. 4) of the drum cartridge 5. The second drum cartridge guide 22B has the same shape as the second drum cartridge guide 22A, and is configured to guide the protrusion 58B (see FIG. 4) of the drum cartridge 5. The third drum cartridge guide 23B has the same shape as the third drum cartridge guide 23A, and is configured to guide the protrusion 59B (see FIG. 4) of the drum cartridge 5.

In the state where the drum cartridge 5 is attached to the housing 2 as illustrated in FIG. 1, the protrusion 57A of the drum cartridge 5 is engaged with the first end E41 of the first drum cartridge guide 21A, the protrusion 58A of the drum cartridge 5 is engaged with the first end E51 of the second drum cartridge guide 22A, and the protrusion 59A of the drum cartridge 5 is engaged with the first end E61 of the third drum cartridge guide 23A.

Further, in the state where the drum cartridge 5 is attached to the housing 2, the protrusion 57B of the drum cartridge 5 is engaged with the first end E41 of the first drum cartridge guide 21B, the protrusion 58B of the drum cartridge 5 is engaged with the first end E51 of the second drum cartridge guide 22B, and the protrusion 59B of the drum cartridge 5 is engaged with the first end E61 of the third drum cartridge guide 23B.

Here, referring to FIG. 24, lengths D1-D4 inside the housing 2 are defined as follows. The length D1 is defined as a clearance in the first direction between a bottom of the first drum cartridge guide 21A and a bottom of the first drum cartridge guide 21B. The length D2 is defined as a clearance in the first direction between a bottom of the second drum cartridge guide 22A and a bottom of the second drum cartridge guide 22B. The length D3 is defined as a clearance in the first direction between a bottom of the third drum cartridge guide 23A and a bottom of the third drum cartridge guide 23B. Further, a length W is defined as a maximum width in the first direction of the drum cartridge 5 and the toner cartridge 6 coupled to each other excluding the protrusions 57A, 57B, 58A, 58B, 59A, 59B, 66A and 66B.

In the present embodiment, the lengths D1, D2, and D3 are greater than the length W. Further, the length D1 is greater than each of the lengths D2 and D3. While the length D2 is equal to the length D3 in the present embodiment, the lengths D2 and D3 may be different lengths from each other.

4.2 Toner Cartridge Guides 24A, 24B

The toner cartridge guide 24A illustrated in FIG. 2 is configured to guide the toner cartridge 6.

Specifically, the toner cartridge guide 24A is configured to guide the protrusion 66A (see FIG. 12) of the toner cartridge 6. The toner cartridge guide 24A is positioned in the third drum cartridge guide 23A. The toner cartridge guide 24A extends in the second direction. The toner cartridge guide 24A has a first end E71 and a second end E72 in the second direction. The first end E71 is positioned between the first end E61 and the second end E62 of the third drum cartridge guide 23A in the third direction. The second end E72 is open to the opening 2A.

The toner cartridge guide 24B illustrated in FIG. 24 is positioned in the other side wall of the housing 2 in the first direction, and is configured to guide the toner cartridge 6 inside the housing 2. Specifically, the toner cartridge guide 24B has the same shape as the toner cartridge guide 24A, and is configured to guide the protrusion 66B (see FIG. 12) of the toner cartridge 6.

In the state where the toner cartridge 6 is attached to the housing 2 as illustrated in FIG. 1, the protrusions 66A and 66B (see FIG. 12) of the toner cartridge 6 are engaged with the first end E71 of the toner cartridge guide 24A and the first end E71 of the toner cartridge guide 24B, respectively.

Here, referring to FIG. 24, a length D4 is further defined as a clearance in the first direction between a bottom of the toner cartridge guide 24A and a bottom of the toner cartridge guide 24B. The length D4 is greater than the length W. The length D4 is equal to the length D1 in the present embodiment, but the length D4 need not be equal to the length D1. Further, in the present embodiment, the length D4 is greater than each of the lengths D2 and D3.

As illustrated in FIG. 22, in a state where the drum cartridge 5 and the toner cartridge 6 are attached to the housing 2 and the lever 70 of the toner cartridge 6 is at the second position, the toner cartridge 6 can be disconnected from the drum cartridge 5. Hence, as illustrated in FIG. 23, the toner cartridge 6 alone can be detached from the housing 2 while the drum cartridge 5 is kept attached to the housing 2.

4.3 First Stoppers 25A

The first stoppers 25A (one of which is illustrated in FIG. 2) are configured to retain the drum cartridge 5 at its attached position in the state where the drum cartridge 5 is attached to the housing 2. Specifically, one of the first stoppers 25A is positioned in the first drum cartridge guide 21A. The first stopper 25A is provided in a form of a leaf spring in the present embodiment. The first stopper 25A in the first drum cartridge guide 21A is configured to urge the protrusion 57A (see FIG. 4) of the drum cartridge 5 toward the first end E41 of the first drum cartridge guide 21A in the state where the drum cartridge 5 is attached to the housing 2.

The other first stopper 25A is also configured to retain the drum cartridge 5 in its attachment position in the state where the drum cartridge 5 is attached to the housing 2. Specifically, the other first stopper 25A is positioned in the first drum cartridge guide 21B (see FIG. 24). The other first stopper 25A is provided in a form of a leaf spring in the present embodiment. The other first stopper 25A in the first drum cartridge guide 21B is configured to urge the protrusion 57B (see FIG. 4) of the drum cartridge 5 toward the first end E41 of the first drum cartridge guide 21B in the state where the drum cartridge 5 is attached to the housing 2.

4.4 Second Stoppers 26A

The second stoppers 26A (one of which is illustrated in FIG. 2) are configured to retain the toner cartridge 6 in its attached position in the state where the toner cartridge 6 is attached to the housing 2. Specifically, one of the second stoppers 26A is positioned in the toner cartridge guide 24A. The second stopper 26A is provided in a form of a leaf spring in the present embodiment. The second stopper 26A in the toner cartridge guide 24A is configured to urge the protrusion 66A (see FIG. 12) of the toner cartridge 6 toward the first end E71 of the toner cartridge guide 24A in the state where the toner cartridge 6 is at its attached position.

The other second stopper 26A is also configured to retain the toner cartridge 6 in its attached position in the state where the toner cartridge 6 is attached to the housing 2. Specifically, the other second stopper 26A is positioned in the toner cartridge guide 24B (see FIG. 24). The other second stopper 26A is provided in a form of a leaf spring in the present embodiment. The other second stopper 26A in the toner cartridge guide 24B is configured to urge the protrusion 66B (see FIG. 12) of the toner cartridge 6 toward the first end E71 of the toner cartridge guide 24B in the state where the toner cartridge 6 is at its attached position.

5. Operational and Technical Advantages (1) According to the drum cartridge 5 of the embodiment, as illustrated in FIG. 3, the developing housing 531 includes a first portion (the first housing 531A) supporting the developing roller 532 and a second portion (the second housing 531B) having the inlet port 5315A. The first portion (the first housing 531A) is movable relative to the photosensitive drum 51, whereas the second portion (the second housing 531B) is immovable relative to the photosensitive drum 51.

With this structure, as illustrated in FIG. 20, in the state where the toner cartridge 6 is coupled to the drum cartridge 5, the developing roller 532 can be made movable relative to the photosensitive drum 51 without displacement of the toner cartridge 6. That is, the pressing force of the developing roller 532 against the photosensitive drum 51 can be maintained constant irrespective of the weight of the toner cartridge 6. As a result, the capacity of the toner cartridge 6 can be enlarged.

Further, the gasket 531C seals the boundary between the first housing 531A and the second housing 531B, and the gasket 531C is elastically deformable in response to the displacement of the first housing 531A relative to the photosensitive drum 51. Hence, this configuration can suppress leakage of toner through the boundary between the first housing 531A and the second housing 531B.

(2) The image-forming apparatus 1 includes the above-described drum cartridge 5, as illustrated in FIG. 1. Hence, the capacity of the toner cartridge 6 can be enlarged in the image-forming apparatus 1.

(3) According to the image-forming apparatus 1, the toner shutter 62 (see FIG. 12) is movable from the toner-shutter closing position (see FIG. 14) to the toner-shutter opening position (see FIG. 15) in response to the movement of the developing shutter 536 from the developing-shutter closing position (see FIG. 10) to the developing-shutter opening position (see FIG. 11) in the state where the toner cartridge 6 is coupled to the drum cartridge 5. Further, the toner shutter 62 is movable from the toner-shutter opening position (see FIG. 15) to the toner-shutter closing position (se FIG. 14) in response to the movement of the developing shutter 536 from the developing-shutter opening position (see FIG. 11) to the developing-shutter closing position (see FIG. 10) in the coupling state of the toner cartridge 6 to the drum cartridge 5.

Further, the lever 70 is independent of the toner shutter 62. The lever 70 is configured to be engaged with the developing shutter 536 in the state where the toner cartridge 6 is coupled to the drum cartridge 5. Specifically, the gear 75A of the lever 70 is meshed with the engagement part 536B (see FIG. 8) of the developing shutter 536 in the state where the toner cartridge 6 is coupled to the drum cartridge 5. The lever 70 is movable between the first position (see FIG. 19) and the second position (see FIG. 18). The lever 70 renders the developing shutter 536 to be at the developing-shutter opening position when the lever 70 is at the first position. The lever 70 renders the developing shutter 536 to be at the developing-shutter closing position when the lever 70 is at the second position.

With this structure, the developing shutter 536 and the toner shutter 62 can be placed at the developing-shutter closing position and the toner-shutter closing position, respectively, at the same time by a single operation to move the lever 70 from the first position to the second position in the state where the drum cartridge 5 and the toner cartridge 6 are coupled to each other.

Further, the developing shutter 536 and the toner shutter 62 can be placed at the developing-shutter opening position and the toner-shutter opening position, respectively, at the same time by a single operation to move the lever 70 from the second position to the first position in the state where the drum cartridge 5 and the toner cartridge 6 are coupled to each other.

Further, the lever 70 is independent of the toner shutter 62, as illustrated in FIG. 12, and the lever 70 is configured to be engaged with the developing shutter 536 in the state where the toner cartridge 6 is coupled to the drum cartridge 5.

With this structure, the toner shutter 62 can remain immovable irrespective of the movement of the lever 70 as long as the toner cartridge 6 is not coupled to the drum cartridge 5. Accordingly, the toner shutter 62 can be restricted from moving from the toner-shutter closing position to the toner-shutter opening position in the state where the toner cartridge 6 is decoupled from the drum cartridge 5.

(4) According to the image-forming apparatus 1, the coupling of the toner cartridge 6 with the drum cartridge 5 cannot be released while the lever 70 is at the first position in the state where the toner cartridge 6 and the drum cartridge 5 are attached to the housing 2, as illustrated in FIG. 20. The toner cartridge 6 can be decoupled from the drum cartridge 5 while the lever 70 is at the second position in the state where the toner cartridge 6 and the drum cartridge 5 are attached to the housing 2, as illustrated in FIG. 21.

This configuration can restrain decoupling of the toner cartridge 6 from the drum cartridge 5 with both the toner outlet opening 615 and the inlet port 5315A open.

(5) As illustrated in FIG. 2, the drum cartridge 5 and the toner cartridge 6 can be detached together from the housing 2 from the state where the toner cartridge 6 and the drum cartridge 5 are attached to the housing 2 and the lever 70 is at the first position.

With this configuration, at a time of occurrence of a paper jam at a position between the photosensitive drum 51 and the transfer roller 54 and/or between the conveyer roller 8 and the counter roller 56, a jammed sheet S can be easily removed by collectively detaching the drum cartridge 5 and the toner cartridge 6 from the housing 2.

Further, as illustrated in FIG. 22, the toner cartridge 6 alone can be detached from the housing 2, independently of the drum cartridge 5, from the state where both the toner cartridge 6 and the drum cartridge 5 are attached to the housing 2 and the lever 70 is at the second position.

With this configuration, replacement of the toner cartridge 6 can be performed by moving the lever 70 to the second position and detaching the toner cartridge 6 from the housing 2, without removal of the drum cartridge 5 from the housing 2.

(6) As illustrated in FIG. 8, the second housing 531B has the outlet port 5315B through which the toner in the developing housing 531 can be discharged. As illustrated in FIG. 12, the toner cartridge 6 has the toner inlet opening 616A to allow toner flow therethrough. The toner inlet opening 616A can communicate with the outlet port 5315B of the second housing 531B in the state where the drum cartridge 5 and the toner cartridge 6 are coupled to each other. The outlet port 5315B is positioned below the inlet port 5315A, and is open downward in the state where the drum cartridge 5 and the toner cartridge 6 are attached to the housing 2.

With this configuration, the toner in the developing housing 531 can be returned into the toner cartridge 6 through the outlet port 5315B by making use of the gravity of the toner. Hence, toner circulation can be realized between the developing housing 531 and the toner cartridge 6, thereby suppressing stagnation of the toner in the developing housing 531.

(7) As illustrated in FIG. 20, the toner cartridge 6 includes the first storage portion 611 and the second storage portion 612. The second storage portion 612 can store the toner supplied from the first storage portion 611. The second storage portion 612 has the toner inlet openings 616A and 616B (see FIG. 12). The amount of toner that can be stored in the second storage portion 612 is greater than the amount of toner that can be stored in the developing housing 531. Further, the amount of toner that can be stored in the first storage portion 611 is greater than the amount of toner that can be stored in the second storage portion 612.

With this structure, since the second storage portion 612 can store a larger amount of toner therein than the developing housing 531, the second storage portion 612 can store a sufficient amount of toner to be supplied to the developing housing 531.

Further, the first storage portion 611 can store a larger amount of toner therein than the second storage portion 612. Hence, the capacity of the first storage portion 611 can be enlarged to realize an increase in the capacity of the toner cartridge 6.

(8) As illustrated in FIG. 1, the toner cartridge 6 includes the sheet guide 614. The sheet guide 614 is configured to guide the sheet S that is conveyed toward the photosensitive drum 51 in the state where the toner cartridge 6 and the drum cartridge 5 are attached to the housing 2.

With this configuration, an increase in size (capacity) of the toner cartridge 6 can be realized in comparison with a structure where a sheet guide is provided separately from a toner cartridge.

Further, the toner cartridge 6 is connected to the second housing 531B that is immovable relative to the photosensitive drum 51. Hence, the sheet guide 614 is also immovable relative to the photosensitive drum 51. Accordingly, the sheet S can be stably guided by the sheet guide 614.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A drum cartridge comprising:

a photosensitive drum rotatable about an axis extending in a first direction;

a developing roller configured to supply toner to the photosensitive drum;

a first frame supporting one end portion of the photosensitive drum in the first direction;

a second frame supporting another end portion of the photosensitive drum in the first direction; and a developing housing having a developing chamber configured to accommodate the toner therein, the developing housing comprising:

a first housing supporting the developing roller, the first housing being movable relative to the photosensitive drum, the first housing being positioned between the first frame and the second frame in the first direction;

a second housing having an inlet port through which the toner can flow into the second housing, the second housing being immovable relative to the photosensitive drum, the second housing being positioned between the first frame and the second frame in the first direction; and a gasket providing a sealing between the first housing and the second housing and elastically deformable in response to movement of the first housing relative to the photosensitive drum, wherein an interior space of the first housing and an interior space of the second housing define the developing chamber.

2. The drum cartridge according to claim 1, wherein the second housing has one end portion in the first direction that is fixed to the first frame, and wherein the second housing has another end portion in the first direction that is fixed to the second frame.

3. An image-forming apparatus comprising:

a housing;

the drum cartridge according to claim 1, the drum cartridge being attachable to and detachable from the housing; and a toner cartridge configured to accommodate toner therein, the toner cartridge being attachable to and detachable from the housing, the toner cartridge being coupled to the drum cartridge in a state where both the toner cartridge and the drum cartridge are attached to the housing.

4. The image-forming apparatus according to claim 3, wherein the toner cartridge has a toner outlet opening through which the toner can be discharged, the toner outlet opening being configured to communicate with the inlet port of the second housing in a state where the toner cartridge is coupled to the drum cartridge.

5. The image-forming apparatus according to claim 4, wherein the drum cartridge further comprises a developing shutter movable between a developing-shutter closing position where the developing shutter closes the inlet port and a developing-shutter opening position where the developing shutter opens the inlet port, and wherein the toner cartridge comprises:

a toner casing having the toner outlet opening and configured to accommodate the toner therein;

a toner shutter movable between a toner-shutter closing position where the toner shutter closes the toner outlet opening and a toner-shutter opening position where the toner shutter opens the toner outlet opening, the toner shutter being movable together with the developing shutter in the state where the toner cartridge is coupled to the drum cartridge, wherein the toner shutter is configured to be move from the toner-shutter closing position to the toner-shutter opening position in response to movement of the developing shutter from the developing-shutter closing position to the developing-shutter opening position, and wherein the toner shutter is configured to move from the toner-shutter opening position to the toner-shutter closing position in response to movement of the developing shutter from the developing-shutter opening position to the developing-shutter closing position; and a lever movable independently of the toner shutter, the lever being configured to engage the developing shutter in the state where the toner cartridge is coupled to the drum cartridge, the lever being movable between a first position where the lever places the developing shutter at the developing-shutter opening position and a second position where the lever places the developing shutter at the developing-shutter closing position.

6. The image-forming apparatus according to claim 5, wherein, in the state where both the toner cartridge and the drum cartridge are attached to the housing, the toner cartridge cannot be decoupled from the drum cartridge while the lever is at the first position, and the toner cartridge can be decoupled from the drum cartridge while the lever is at the second position.

7. The image-forming apparatus according to claim 6, wherein, in the state where both the toner cartridge and the drum cartridge are attached to the housing, the drum cartridge and the toner cartridge can be detached together as a unit from the housing while the lever is at the first position, and the toner cartridge alone can be detached from the housing independently of the drum cartridge while the lever is at the second position.

8. The image-forming apparatus according to claim 4, wherein the second housing further has an outlet port through which the toner in the developing housing can be discharged therefrom, the outlet port being positioned apart from the inlet port in the first direction, wherein the toner cartridge has a toner inlet opening through which the toner can flow into the toner cartridge, the toner inlet opening being configured to communicate with the outlet port of the second housing in the state where the toner cartridge is coupled to the drum cartridge, and wherein the outlet port is positioned below the inlet port in the state where both the toner cartridge and the drum cartridge are attached to the housing.

9. The image-forming apparatus according to claim 8, wherein the drum cartridge further comprises a conveying member configured to convey the toner in the developing housing from the inlet port to the outlet port, the conveying member being supported by the first housing.

10. The image-forming apparatus according to claim 8, wherein the toner cartridge comprises:

a first storage portion configured to store the toner therein, the first storage portion having a first capacity to store the toner therein; and a second storage portion configured to store the toner supplied from the first storage portion, the second storage portion having the toner outlet opening and the toner inlet opening, the second storage portion having a second capacity to store the toner therein, the first capacity of the first storage portion being greater than the second capacity of the second storage portion, and wherein the second capacity of the second storage portion is greater than a capacity of the developing housing to store the toner therein.

11. The image-forming apparatus according to claim 3, wherein the toner cartridge includes a sheet guide configured to guide a sheet that is conveyed toward the photosensitive drum in the state where both the toner cartridge and the drum cartridge are attached to the housing.

* * * * *